(12) United States Patent  
Sekiguchi

(10) Patent No.: US 6,512,556 B1  
(45) Date of Patent: Jan. 28, 2003

(54) LIQUID CRYSTAL DISPLAY AND METHOD OF MANUFACTURING THE SAME

(75) Inventor: Kanetaka Sekiguchi, Sayama (JP)

(73) Assignee: Citizen Watch Co., Ltd., Nishitokyo (JP)

( * ) Notice: Subject to any disclaimer, the term of this patent is extended or adjusted under 35 U.S.C. 154(b) by 0 days.

(21) Appl. No.: 09/238,179

(22) Filed: Jan. 28, 1999

Related U.S. Application Data

(62) Division of application No. 08/765,434, filed as application No. PCT/JP95/01412 on Jul. 14, 1995, now Pat. No. 5,893,621.

(30) Foreign Application Priority Data

Jul. 14, 1994 (JP) .............................................. 6-161844

(51) Int. Cl.[7] ........................... G02F 1/135; G02F 1/136  
(52) U.S. Cl. .......................................... 349/49; 399/51  
(58) Field of Search ........................... 349/51, 139, 49, 349/143; 392/51, 139, 99, 193

(56) References Cited

U.S. PATENT DOCUMENTS

| | | | | |
|---|---|---|---|---|
| 5,069,534 A | * | 12/1991 | Hirai | 349/51 |
| 5,128,784 A | | 7/1992 | Suzuki et al. | 349/51 |
| 5,227,901 A | | 7/1993 | Iizuka et al. | 349/51 |
| 5,396,353 A | * | 3/1995 | Takahashi et al. | 349/51 |
| 5,442,224 A | | 8/1995 | Yoshimizu et al. | 257/536 |
| 5,596,432 A | | 1/1997 | Sekiguchi et al. | 349/51 |
| 5,600,458 A | | 2/1997 | Okano et al. | 349/49 |

FOREIGN PATENT DOCUMENTS

| | | | | |
|---|---|---|---|---|
| JP | 61-112126 | * | 5/1986 | 349/51 |
| JP | 62-21126 | * | 1/1987 | 349/51 |
| JP | 64-57673 | | 3/1989 | |
| JP | 2-73234 | | 3/1990 | |
| JP | 2-170137 | | 6/1990 | |
| JP | 4-30125 | * | 2/1992 | 349/51 |
| JP | 5-27269 | | 2/1993 | |
| JP | 5-289105 | | 11/1993 | |
| JP | 8-5988 | | 1/1996 | |

\* cited by examiner

Primary Examiner—Toan Ton  
(74) Attorney, Agent, or Firm—Armstrong, Westerman & Hattori, LLP

(57) ABSTRACT

Upper electrodes (10, 11) and lower electrodes (2) formed on a substrate (1) of a liquid crystal display are disposed so as to cross each other, and two nonlinear resistance elements (13, 14) are constituted by each of the upper electrodes, an insulation film, and each of the lower electrodes. One of the upper electrodes constituting the nonlinear resistance elements is connected with a signal electrode (9), and the other with one of the display electrodes (12) constituting display pixels. Connection portions (4) connecting an anodic oxidation electrode (3) with each of the lower electrodes (2) are split in parts of regions thereof such that the lower electrodes (2) each resembling an island in shape are formed, and each of the display electrodes is provided with an overlapping portion 15 thereunder, partially overlapped with each of the connection portions (4) where a double layer film consisting of a metal film and an insulation film is left intact.

In the liquid crystal display constituted as above, an asymmetrical current-voltage characteristic thereof due to a voltage applied to the signal electrode (9) is turned symmetrical, and a d-c voltage component applied to a liquid crystal layer is reduced, preventing deterioration in the quality of liquid crystal and the contrast of display, and occurrence of a flicker phenomenon and an image sticking, that is, after-image phenomenon.

3 Claims, 22 Drawing Sheets ously occurs, resulting in
LIQUID CRYSTAL DISPLAY AND METHOD OF MANUFACTURING THE SAME This application is a division of prior application Ser. No. 08/765,434 filed Jan. 14, 1997, which is a national stage application under § 371 of international application PCT/JP95/01412 filed Jul. 14, 1995 now U.S. Pat. No. 5,893,621.

TECHNICAL FIELD

The present invention relates to a liquid crystal display comprising MIM elements composed of metal-insulator-metal structures or metal-insulator-transparent and electrical conductor structures, and a method of manufacturing the same.

BACKGROUND TECHNOLOGY

Along with an advance in commercial application of liquid crystal displays, liquid crystal displays of an active matrix type capable of displaying images of excellent quality have come by now to occupy a position in the mainstream of the market.

The active matrix type liquid crystal display described above comprises thin-film transistors (TFTs), diodes, or nonlinear resistance elements of a metal-insulator-metal (referred to hereinafter as "MIM") structure composed of three layers consisting of metal-insulator-metal or metal-insulator-transparent and electrical conductor, as switching elements for each of liquid crystal display electrodes for displaying images.

The MIM elements described above is generally composed of a Ta—$Ta_2O_5$—Cr or Ta—$Ta_2O_5$-ITO structure. Herein, Ta refers to a tantalum film, $Ta_2O_5$ a tantalum oxide film, Cr a chromium film, and ITO an indium tin oxide film.

With a liquid crystal display using MIM elements, images are displayed by switching on and off a liquid crystal layer connected in series with the MIM elements by taking advantage of a nonlinear voltage-current characteristic of the MIM elements.

Now referring to FIGS. 29 to 32, the structure of a conventional liquid crystal display panel having nonlinear resistance elements composed of the Ta—$Ta_2O_5$-ITO structure is described hereafter.

As shown clearly in FIG. 32, the MIM element comprises a tantalum (Ta) film as a lower electrode 103 formed on a first substrate 102, a tantalum oxide ($Ta_2O_5$) film as an insulation film 104 formed on the lower electrode, and a transparent and electrically conductive film 10 composed of an indium tin oxide (ITO) film as an upper electrode 105 formed on the insulation film, all these films together constituting a nonlinear resistance element.

In addition, the MIM element is provided with a display electrode 106 composed of an indium tin oxide film. Data signals dependent on the contents of display are applied on the display electrode 106 via the nonlinear resistance element by a signal electrode 107 composed of a tantalum film and a tantalum oxide film.

This liquid crystal display is provided with the first substrate 102 on which the nonlinear resistance elements are formed and a second substrate 109 (refer to FIG. 29) having opposite electrodes 110 (as indicated by phantom lines in FIG. 30) formed in such a way as to face the display electrodes 106 formed on the first substrate 102.

After applying liquid crystal-molecular alignment treatment to the surfaces of the first substrate 102 and the second substrate 109, the two substrates are bonded together with a sealing portion 108 such that the surfaces of the both substrates face each other at a predetermined spacing, and liquid crystals are sealed in a gap formed therebetween, thus forming a liquid crystal display. A region surrounded by a phantom line 118 as indicated in FIG. 29 and a solid line 118 as indicated in FIG. 30 represents a display region of the liquid crystal display.

However, the liquid crystal display having the conventional nonlinear resistance elements described above poses a problem of an after-image phenomenon occurring when an image displayed is changed in the course of driving the liquid crystal display.

Referring to FIG. 33, the after-image phenomenon is described. Herein, the liquid crystal display is assumed to display images in "normally white" mode.

FIG. 33 indicates variation in transmissivity of light when an applied voltage for a random pixel is varied for every 5 minutes. Specifically, a voltage (VI) for providing a display of 50% transmissivity is applied for first 5 minutes (unselect period: T1), then a voltage (V2) for providing a display of 10% transmissivity is applied for another 5 minutes (select period: T2), and further a voltage (V3) at the same level as that of the voltage (V1) applied for the first unselect period T1 is applied for yet another 5 minutes (unselect period: T3).

The after-image phenomenon is a phenomenon wherein a difference (ΔT) in transmissivity between the unselect period T1 and the unselect period T3 develops although the voltages applied for respective periods are equal. With the liquid crystal display described above, the difference ΔT in transmissivity was found to be 5%.

The occurrence of the after-image phenomenon results in the display of an image with its contents different from those of an originally intended image.

Therefore, an image sticking phenomenon, that is, the after-image phenomenon degrades considerably the quality of images displayed by the liquid crystal display, posing a serious problem in commercial application thereof.

A primary cause for the occurrence of the after-image phenomenon is a d-c voltage component of a voltage applied on the liquid crystal layer when driving the liquid crystal display. Owing to the d-c voltage component, a polarization phenomenon of alignment layers used for aligning liquid crystal molecules in a predetermined direction and the degradation of liquid crystals themselves occurs, resulting in the occurrence of the after-image phenomenon.

FIG. 34 is a graph showing a current-voltage characteristic (I–V characteristic) of a non-linear resistance element composed of a "tantalum film-tantalum oxide film-indium tin oxide film" structure according to a conventional structure.

As shown in the figure, variation in current value differs considerably depending on the polarity of an applied voltage, demonstrating an asymmetrical current-voltage characteristic with respect to a voltage at zero.

As a means for achieving an improvement on the asymmetrical current-voltage characteristic, it is conceivable to replace the indium tin oxide film composing the upper electrode 105 of nonlinear resistance elements with such a metal film as a chromium (Cr) film, a titanium (Ti) film or the like.

Such replacement of the indium tin oxide film with the chromium film or the titanium film in forming the upper electrode 105 can moderate to some extent the asymmetry of the current-voltage characteristic as shown in FIG. 34, but is still far from achieving a fully symmetrical current-voltage characteristic.

Further, an offset driving method is proposed to prevent the d-c voltage component from being applied on the liquid crystal layer through the nonlinear resistance elements having the asymmetrical current-voltage characteristic. The offset driving method is described hereafter with reference to FIG. 35.

As shown in FIG. 35, the offset driving method is a method of driving the liquid crystal display by varying voltages applied in a select period (Ts) and a hold period (Th), respectively, depending on the polarity of an electric field, that is, a (+) field or a (−) field so that the d-c voltage component will not be applied on the liquid crystal layer by compensating for the asymmetric characteristic of the element with a varying driving voltage.

Voltages applied in the select period (Ts) are denoted Va1 and Va2, and voltages applied in the hold period (Th) are Vb1 and Vb2.

With the offset driving method as shown in FIG. 35, the d-c voltage component of a voltage applied between the display electrodes 106 and the opposite electrodes 110, disposed facing each other, with the liquid crystal layer sandwiched therebetween can be reduced.

However, asymmetrical voltages, for example, Vb2 and Vb1 are applied on the signal electrodes 107 as shown in FIGS. 30 and 31, but symmetrical voltages are applied on the liquid crystal layer. Consequently, a voltage between the signal electrodes 107 on the first substrate 102 composing the MIM elements and the display electrodes 106 contains the d-c voltage component. Furthermore, the d-c voltage component occurs similarly between the opposite electrodes 110 and the signal electrodes 107.

As a result, with nonlinear resistance elements having the asymmetric current-voltage characteristic, it was impossible to reduce sufficiently the d-c voltage component impressed on the liquid crystal layer, eliminating the after-image phenomenon completely.

Therefore, it is an object of the present invention to provide an liquid crystal display capable of displaying images of excellent quality without the effect of the after-image phenomenon by reducing a d-c voltage component impressed on the liquid crystal layer in its nonlinear resistance elements having an asymmetrical current-voltage characteristic.

DISCLOSURE OF THE INVENTION

To achieve the aforesaid object, the present invention provides a method of manufacturing liquid crystal display and a liquid crystal device as follows.

According to the present invention, a method of manufacturing the liquid crystal display comprises the following steps:

A. a process of forming a metal film on a substrate, then forming a plurality of anodic oxidation electrodes, a common electrode connecting together the anodic oxidation electrodes, lower electrodes of nonlinear resistance elements, and connection portions connecting the lower electrodes with the anodic oxidation electrodes by patterning on the metal film by means of a photo etching method;

B. a process of forming an insulation film by means of an anodic oxidation method applied to each of the anodic oxidation electrodes, the connection portions, and the lower electrodes, joined integrally with the common electrode, using the common electrode as an anode;

C. a process of forming a transparent and electrically conductive film on the insulation film and the substrate, then forming display electrodes on the substrate such that each of the display electrodes is provided with an overlapping portion covering a part of each of the connection portions, and forming a signal electrode on each of the anodic oxidation electrodes such that a gap is provided between each of the signal electrodes and each of the lower electrodes, then forming a first upper electrode connected with each of the single electrodes and a second upper electrode connected with each of the display electrodes, on each of the lower electrodes by patterning on the transparent and electrically conductive film by means of the photo etching method;

D. a process of forming a photosensitive resin in a region covering each of the lower electrodes, the first and the second upper electrodes; and E. a process of etching the metal film and each of the connection portions, having a structure of laminated layers composed of the metal film and the insulation film of the anodic oxidation film formed on the metal film, completely down to the surface of the substrate by means of the etching method using the photosensitive resin, the display electrodes, and the signal electrodes as etching masks such that each of the connection portions automatically matches a plurality of sides of the display electrodes and the signal electrodes, separating the anodic oxidation electrodes disposed underneath the signal electrodes, overlapping portions of each of the connecting portions, disposed underneath each of the display electrodes, and the lower electrodes from each other such that each of the lower electrodes is isolated and formed in a shape resembling an island, forming a first nonlinear resistance element and a second nonlinear resistance element composed of each of the lower electrodes, the insulation film and the first and second upper electrodes, respectively, and electrically isolating the anodic oxidation electrodes form each other by removing the common electrode connecting the plurality of the anodic oxidation electrodes with each other by means of the etching method using the signal electrodes as etching masks.

In the step C, the display electrodes are formed such that each of the display electrodes is provided with overlapping portions covering parts of each of the connecting portions connecting the lower electrode of the nonlinear resistance element for a pixel adjacent to the relevant pixel with the anodic oxidation electrode.

The steps C, D, and E described as above may be replaced with the following steps:

a process of forming a metal film on the insulation film and the substrate which were formed in step B, then forming signal electrodes on the anodic oxidation electrodes, and forming a first upper electrode connected with each of the signal electrodes and a second upper electrode having a paid on each of the lower electrodes by patterning on the metal film by mans of the photo-etching method;

a process of forming a transparent and electrically conductive film on the insulation film and the substrate including the pad surface, then forming display electrodes electrically isolated from the signal electrodes and the lower electrodes such that each of the display electrodes is provided with an overlapping portion covering a part of each of the connection portions and the pad by patterning on the transparent and electrically conductive film by the photo-etching method;

a process of forming a photosensitive resin in a region covering each of the lower electrodes, the first and the second upper electrodes; and a process of etching the metal film and each of the connection portions, having a structure of laminated layers composed of the metal film and the insulating film of the anodic oxidation film formed on the metal film, completely down to the surface of the substrate by means of the etching method using the photosensitive resin, the display electrodes, and the signal electrodes, each made of different material, as etching masks such that each of the connection portions automatically matches a plurality of sides of the display electrodes and the signal electrodes, separating the anodic oxidation electrodes disposed underneath the signal electrodes, overlapping portions of each of the connection portions, disposed underneath each of the display electrodes, and the lower electrodes from each other such that each of the lower electrodes is isolated and formed in a shape resembling an island, forming a first nonlinear resistance element and a second nonlinear resistance element composed of each of the lower electrodes, the insulation film and the first and second upper electrodes, respectively, and electrically isolating the anodic oxidation electrodes from each other by removing the common electrode connecting the plurality of the anodic oxidation electrodes with each other by means of the etching method using the signal electrodes as etching masks.

The process of forming a photosensitive resin, i a region covering each of the lower electrodes and the first and second upper electrodes, and the following process thereto may be replaced with the following steps:

a process of forming a photosensitive resin in a region covering about half of the first upper electrode and the second upper electrode, respectively, on the side facing each other, on each of the lower electrodes, and the surface of each of the lower electrodes therebetween; and a process of etching each of the connection portions, having a structure of laminated layers composed of the metal film and the insulation film of the anodic oxidation film formed on the metal film, and each of the lower electrodes completely down to the surface of the substrate by means of the etching method using the photosensitive resin, the display electrodes, the first upper electrode, the second upper electrode, and the signal electrodes, all of which are made of different materials, as etching masks such that each of the connection portions automatically matches with a plurality of sides of the display electrodes and the signal electrodes, separating the anodic oxidation electrodes disposed underneath the signal electrodes, overlapping portions of each of the connection portions disposed underneath each of the display electrodes, and the lower electrodes from each other such that each of the lower electrodes automatically matches an external side of the first upper electrode and the second upper electrode, respectively, forming a first nonlinear resistance element and a second nonlinear resistance element composed of each of the lower electrodes, the insulation film and the first and second upper electrodes, respectively, and electrically isolating the anodic oxidation electrodes from each other by removing the common electrode connecting the plurality of the anodic oxidation electrodes with each other by means of the etching method using the signal electrodes as etching masks.

In the steps of the method of manufacturing the liquid crystal display, forming a metal film on the substrate, and forming a plurality of anodic oxidation electrodes, a common electrode connecting together the anodic oxidation electrodes, lower electrodes of nonlinear resistance elements, and connection portions connecting each of the lower electrodes with each of the anodic oxidation electrodes by patterning on the metal film by means of the photo-etching method, each of the connection portions is formed integrally with the anodic oxidation electrode formed under the signal electrode in a row or column different from that for a signal electrode connected with the nonlinear resistance element for the relevant pixel; and in the step of forming the display electrodes, the display electrodes are formed such that each of the display electrodes is provided with overlapping portions covering parts of each of the connection portions, connected with the lower electrode of the nonlinear resistance element for a pixel adjacent to the relevant pixel.

In the steps A to E of the method of manufacturing the liquid crystal display, the steps D and E may e replaced with the following steps:

a process of forming an overcoating insulation film on the entire surface of the substrate, after steps A to C, including the surfaces of all the electrodes and the connection portions formed thereon, after the aforesaid processes, and forming openings by the photo etching method in the overcoating insulation film in regions covering the overlapping portions where the display electrodes are partially overlapped with the connection portions, and parts of the connection portions, in regions protruding from the display electrodes; and a process of etching each of the connection portions, having a structure of laminated layers composed of the metal film and the insulation film of the anodic oxidation film formed on the metal film, completely down to the surface of the substrate by means of the etching method using the overcoating insulation film, the display electrode inside the opening in the overcoating insulation film and the signal electrode as etching masks such that each of the connection portions automatically matches with a plurality of sides of the display electrode and the signal electrode, separating the anodic oxidation electrode disposed underneath the signal electrode, overlapping portions of each of the connection portions disposed underneath each of the display electrodes, and the lower electrodes form each other such that each of the lower electrodes is isolated and formed in an island-like shape, and forming a first nonlinear resistance element and a second nonlinear resistance element composed of the aforesaid lower electrode, the insulation film and the second upper electrodes, respectively.

By the method described above, it is possible to manufacture efficiently a liquid crystal display, having a pair of nonlinear resistance elements in good symmetry per pixel and having excellent quality of image without the effect of the after-image phenomenon.

In addition, the present invention provides another liquid crystal display described hereinafter.

The liquid crystal display provided with display electrodes disposed in a matrix configuration on a substrate, each of the display electrodes constituting a pixel, has the following constitution.

The liquid crystal display comprises an anodic oxidation electrode and lower electrodes each resembling an island in shape, both of which are composed of a metal film and formed on a substrate, an insulation film formed on the metal film, two upper electrodes composed of a transparent and electrically conductive film formed on each of the lower electrodes with the insulation film interposed in-between, display electrodes composed of a transparent and electrically conductive film, and signal electrodes composed of a metal film or a metal film and a transparent and electrically conductive film.

The two upper electrodes so disposed as to cross the lower electrode, the insulation film, and the lower electrode constitute two nonlinear resistance elements. One of the two upper electrodes, constituting one of the nonlinear resistance elements, is connected with one of the signal electrodes while the other is connected with one of the display electrodes.

The display electrodes constituting the pixels consist of two types of display electrodes, one type provided thereunder with an overlapping portion having a remaining double layer film, consisting of the same metal film as that for the lower electrodes and the insulation film, and the other type not provided thereunder with the overlapping portion.

In the case of a liquid crystal display wherein a plurality of display electrodes constitute one pixel, the display electrodes for the pixel consist of one display electrode provided thereunder with overlapping portions having a remaining double layer film, consisting of the same metal film as that for the lower electrodes and the insulation film, and the other display electrode not provided thereunder with the overlapping portion.

Or preferably, the display electrodes for constituting one pixel may consist of one display electrode provided thereunder with the overlapping portion having a remaining double layer film, consisting of the same metal film as that for the lower electrodes and the insulation film, and the other display electrode not provided thereunder with the overlapping portion, and furthermore, the nonlinear resistance elements of a plurality of display electrodes for constituting one pixel may be disposed to converge around a focal point.

Also, the present invention provides a liquid crystal display comprising an anodic oxidation electrode and lower electrodes, both of which are composed of a metal film and formed on a substrate, an insulation film formed on the surface of the metal film, upper electrodes formed on each of the lower electrodes with the insulation film interposed in-between, display electrodes connected with the upper electrodes, and signal electrodes composed of the lower electrode or the lower electrode and the insulation film.

And the upper electrodes so disposed as to cross the lower electrode, the insulation film, and the lower electrode constitute nonlinear resistance elements, and the anodic oxidation electrode or the anodic oxidation electrode and part of the insulation film are provided with overlapping portions kept intact under each of the display electrodes.

It is desirable that one of the two upper electrodes, constituting one of the nonlinear resistance elements, is connected with one of the signal electrodes while the other is connected with one of the display electrodes.

It is important to reduce an area ratio of the peripheral region of the display electrodes, not utilized for displaying images, to the display electrodes thereof to improve the quality of images. Also, in the case of a high density liquid crystal display, it is important to minimize the area of the peripheral region thereof.

For this reason, the display electrodes having the double layer films consisting of the metal film and the insulation film thereunder and the display electrodes not having the same can be provided by concentrating the nonlinear resistance elements, resulting in reduction of the area occupied by the connection portions. The connection portions being the areas shielding light, brighter display can be obtained in this way.

Furthermore, in the case of a liquid crystal display wherein a plurality of display electrodes constitute one pixel, the display electrodes can be made best use of by providing fewer number of the display electrodes having the double layer film thereunder than that of the display electrodes not having the same by concentrating the nonlinear resistance elements because the area of the connection portions shielding light is thus reduced.

In the case of a high density liquid crystal display provided with pixels at a small pitch or a large-sized liquid crystal display, the anodic oxidation electrode has limitations in its width. Accordingly, the anodic oxidation electrode with a large width is used until the anodic oxidation process is completed, and then a part thereof is removed after the display electrodes are formed. As this will enable the anodic oxidation electrode to have a large width, the insulation film required in the high density liquid crystal display or the large-sized liquid crystal display can be formed uniformly in a short time.

Furthermore, by using a part of the anodic oxidation electrode and the display electrode as etching masks when splitting the connection portion between the anodic oxidation electrode and the lower electrode resembling an island in shape, the insulation film can be formed uniformly in a short time without increasing the number of processing steps.

Also, the overlapping portions of the anodic oxidation electrode, remaining intact under the display electrodes, can then be used for a part of black matrices, contributing to an improvement on accuracy in aligning the black matrices with the display electrodes.

BEST MODE FOR CARRYING OUT THE INVENTION

This invention will be described in further detail hereinafter with reference to the accompanying drawings.

First Embodiment

Figure 1:
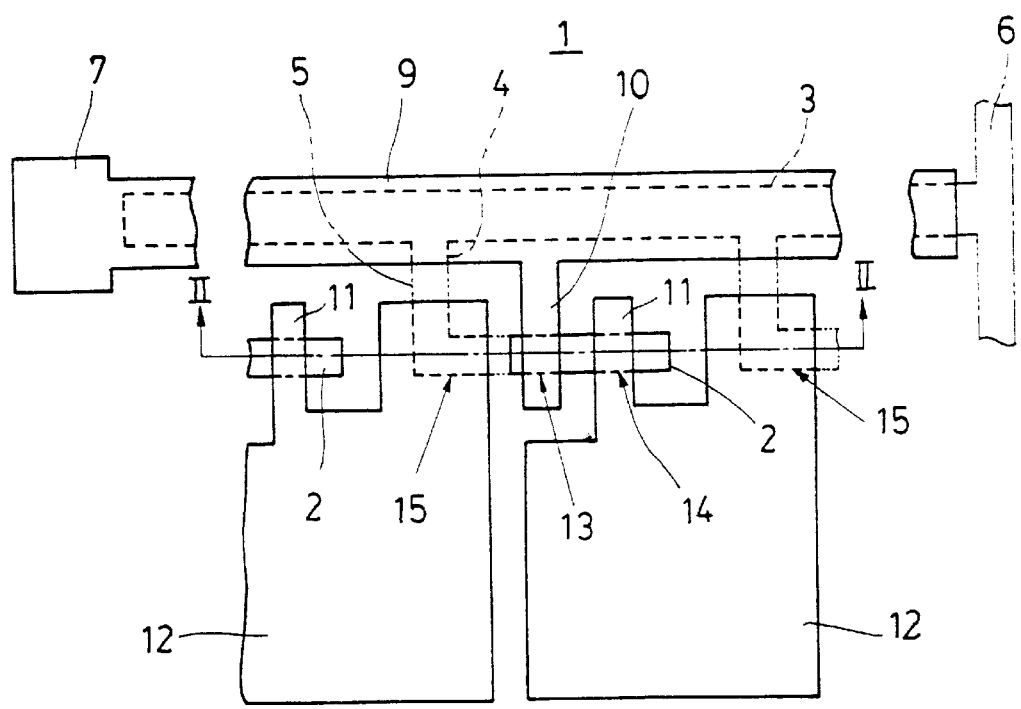
FIG. 1 is a plan view of a portion of a liquid crystal display, constituting nonlinear resistance elements, according to a first embodiment of the invention, FIG. 2 an expanded sectional view taken along the line II—II of FIG. 1, FIG. 3 a diagram showing a current-voltage characteristic of the nonlinear resistance elements, FIG. 4 a diagram showing an after-image phenomenon in the liquid crystal display, and FIG. 5 a timing chart showing a driving waveform applied on scanning electrodes of the liquid crystal display.
Figure 2:
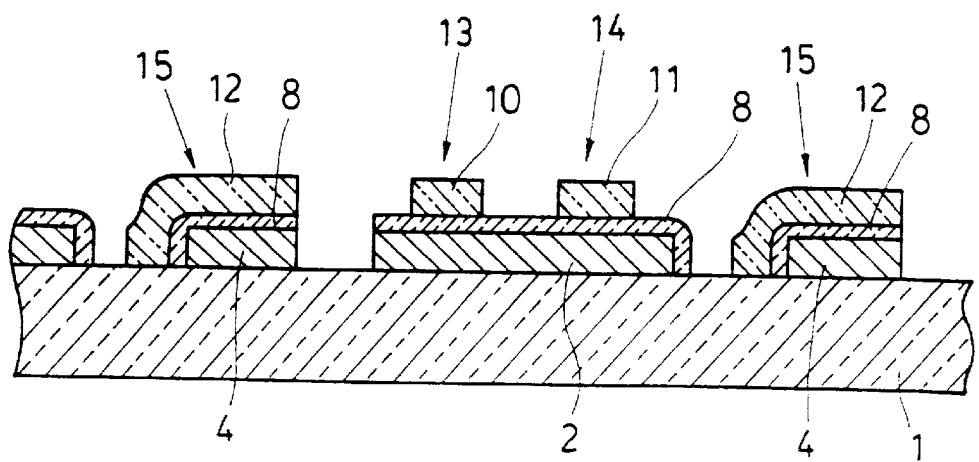

FIG. 1 is a plan view showing a portion of a region for a first substrate for forming nonlinear resistance elements (MIM elements) of a liquid crystal display according to a first embodiment of the invention. FIG. 2 is an expanded sectional view taken along the line II—II of FIG. 1. Firstly, referring to these figures, the constitution of the liquid crystal display according to the first embodiment of the invention is described.

An anodic oxidation electrode 3, lower electrodes 2, and connection portions 4 for connecting the anodic oxidation electrode 3 with the lower electrodes 2, all of which are composed of a metal film, that is, a tantalum (Ta) film, are provided on a transparent first substrate 1, that is, an active substrate for composing the nonlinear resistance elements.

One end of the anodic oxidation electrode 3 is connected with a common electrode 6, and the other end with an input terminal 7 for applying signals from an external circuit to the nonlinear resistance elements. The common electrode 6 is used as an electrode for the anodic oxidation process whereby an insulation film 8 is formed on the surface of the lower electrode 2.

In FIG. 1, a region indicated by a dash and double-dotted line 5 of one of the connection portions 4, between a signal electrode 9 and one of display electrodes 12, the same region of another of the connection portions 4, between the common electrode 6 and another of the display electrodes 12, disposed in a region on the right side of a first upper electrode 10, and the like will be removed in a step of a manufacturing method described hereafter.

This means that FIG. 1 shows merely an intermediate step of a manufacturing process for clarity in description.

An insulation film 8 composed of a tantalum oxide ($Ta_2O_5$) film formed by the anodic oxidation of the lower electrodes 2 is provided on the surface of the lower electrodes 2.

Then a transparent and electrically conductive film is formed on the anodic oxidation electrode 3, serving as the signal electrode 9. A first upper electrode 10 connected with the signal electrode 9 is provided on one of the lower electrodes 2, and further a second upper electrode 11 connected with one of the display electrodes 12 is provided on the aforesaid lower electrode 2.

The first upper electrode 10 and the second upper electrode 11 are formed on each of the lower electrodes 2, resembling an island in shape, with the insulation film 8 interposed in-between.

The lower electrode 2, the insulation film 8, and the first upper electrode 10 constitute a first nonlinear resistance element 13 while the lower electrode 2, the insulation film 8, and the second upper electrode 11 constitute a second nonlinear resistance element 14.

Herein, the signal electrode 9, the first upper electrode 10, the second upper electrode 11, and the display electrodes 12 are all composed of a transparent and electrically conductive film, for example, an indium tin oxide (ITO) film.

The signal electrode 9 for connection with the external circuit is further connected with the input terminal 7.

A region for each of the display electrodes 12 has an overlapping portion 15 partially overlapped with a portion of a region for each of the connection portions 4 connecting the anodic oxidation electrode 3 with each of the lower electrodes 2.

The display electrodes 12 are separated from the signal electrode 9 in a part of the region for each of the connection portions 4, thus forming the lower electrodes 2 each resembling an island in shape.

Herein, the first nonlinear resistance element 13 and the second nonlinear resistance element 14, provided in a region between the signal electrode 9 and the display electrodes 12, are composed of "an indium tin oxide film—a tantalum oxide film—a tantalum film" and "a tantalum film—a tantalum oxide film—an indium tin oxide film", connected in this order, respectively.

This means that an electric current path is provided between the signal electrode 9 and each of the display electrodes 12 such that electric current flows from "the indium tin oxide film—the tantalum oxide film—the tantalum film" of the first nonlinear resistance element 13 to "the tantalum film—the tantalum oxide film—the indium tin oxide film" of the second nonlinear resistance element 14.

As a result, connection from the signal electrode 9 to each of the display electrodes 12 at one of the nonlinear resistance elements, and connection from the aforesaid display electrode 12 to the signal electrode 9 at the other of the nonlinear resistance elements become structurally symmetrical to each other.

Figure 3:
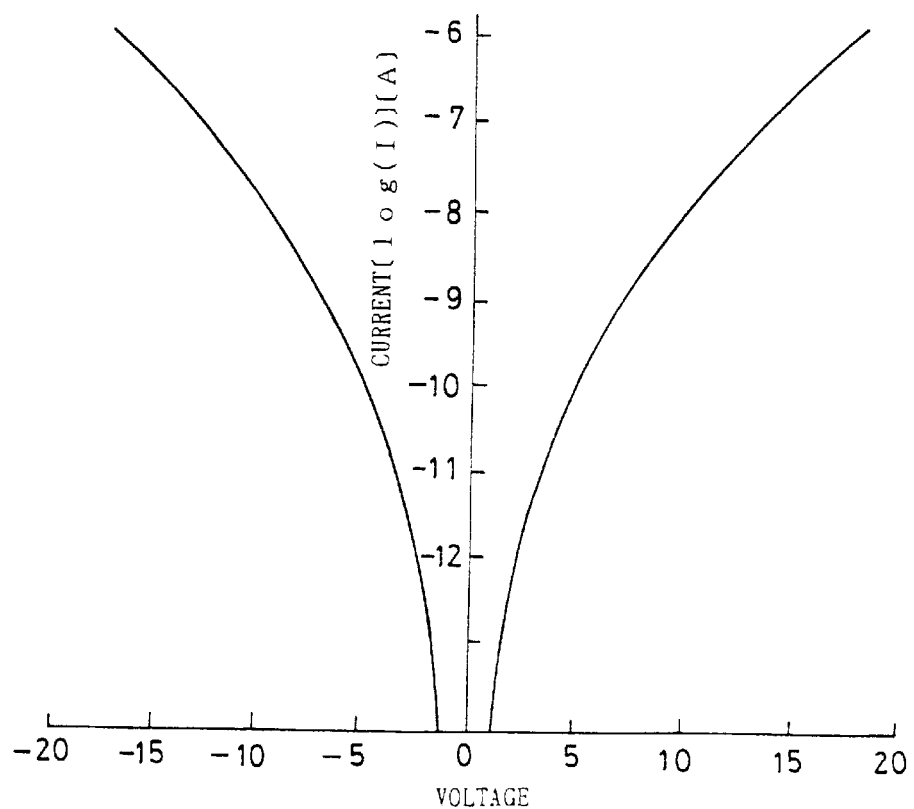

The current-voltage (I–V) characteristic of the nonlinear resistance elements according to the first embodiment of the invention is described hereafter with reference to FIG. 3.

As shown in FIG. 3, the nonlinear resistance elements having symmetrical connections between the display electrodes and the signal electrode show a characteristic of symmetrical current (I) curves with respect to the voltage (V) axis.

Figure 4:
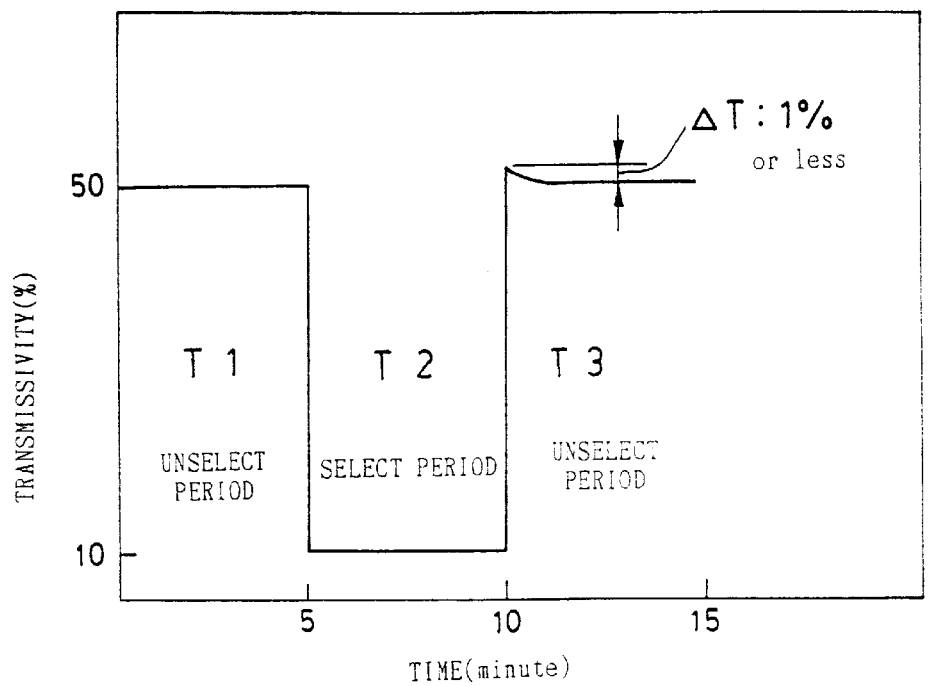

Now, referring to FIG. 4, an after-image phenomenon occurring in this case is described hereafter.

Figure 33:
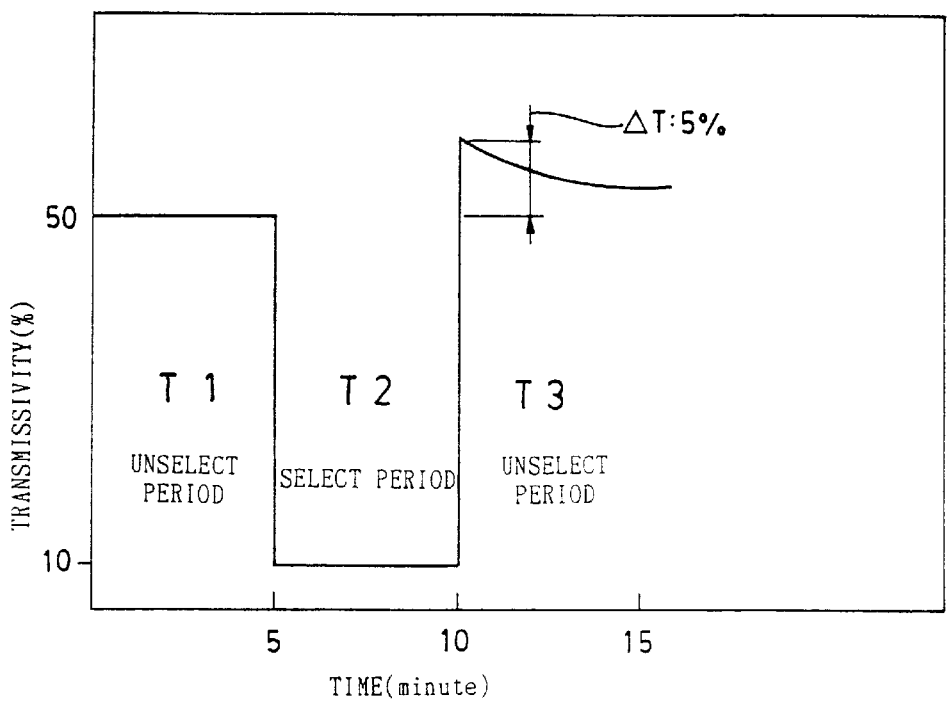
FIG. 33 is a diagram showing an after-image phenomenon in the conventional liquid crystal display, FIG. 34 a diagram showing a current-voltage characteristic of the nonlinear resistance element of the same, and FIG. 35 a timing chart showing a waveform of a driving voltage applied on signal electrodes of the same.
Figure 34:
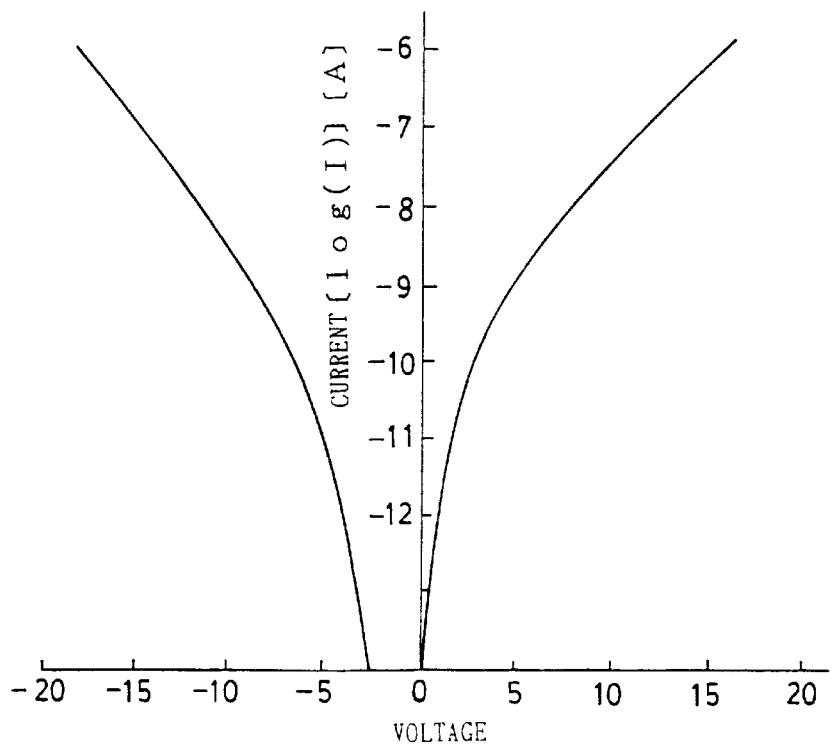
Figure 35:
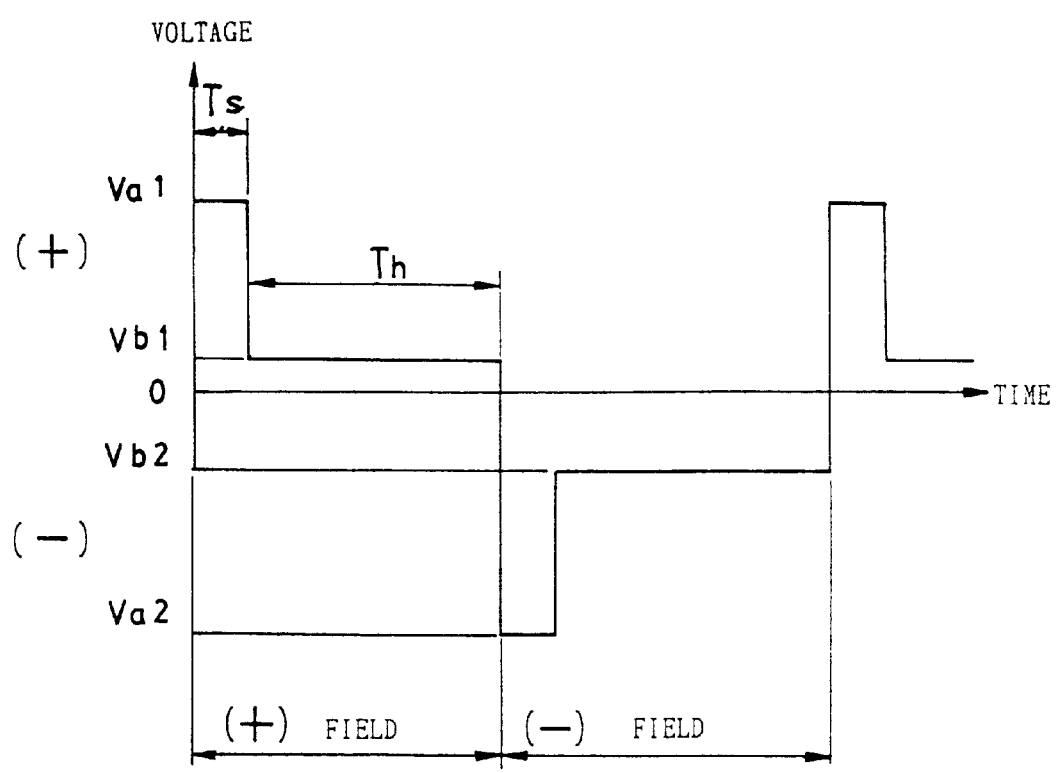

Similarly to FIG. 33 illustrating the after-image phenomenon occurring when driving the conventional liquid crystal display, FIG. 4 shows variation in transmissivity when an applied voltage is varied every 5 minutes with respect to a pixel of the liquid crystal display provided with the nonlinear resistance elements according to the invention. This liquid crystal display is driven in normally white mode.

Firstly, a voltage (V1) for display at 50% transmissivity is applied for 5 minutes (unselect period: T1), then a voltage (V2) for display at 10% transmissivity is applied for another 5 minutes (select period: T2), and further, a voltage (V3) at the same level as that of the voltage (V1) applied for the initial unselect period T1 is applied for yet another 5 minutes (unselect period: T3).

The after-image phenomenon is a phenomenon wherein a difference (ΔT) in transmissivity occurs between the unselect period T1 and the other unselect period T3 although the applied voltages for the respective periods are equal.

With use of the nonlinear resistance elements according to the first embodiment of the invention, the difference (ΔT) in transmissivity is reduced down to 1% or less as shown in FIG. 4. Furthermore, with the elapse of time, the difference ΔT in transmissivity declines rapidly.

Figure 5:
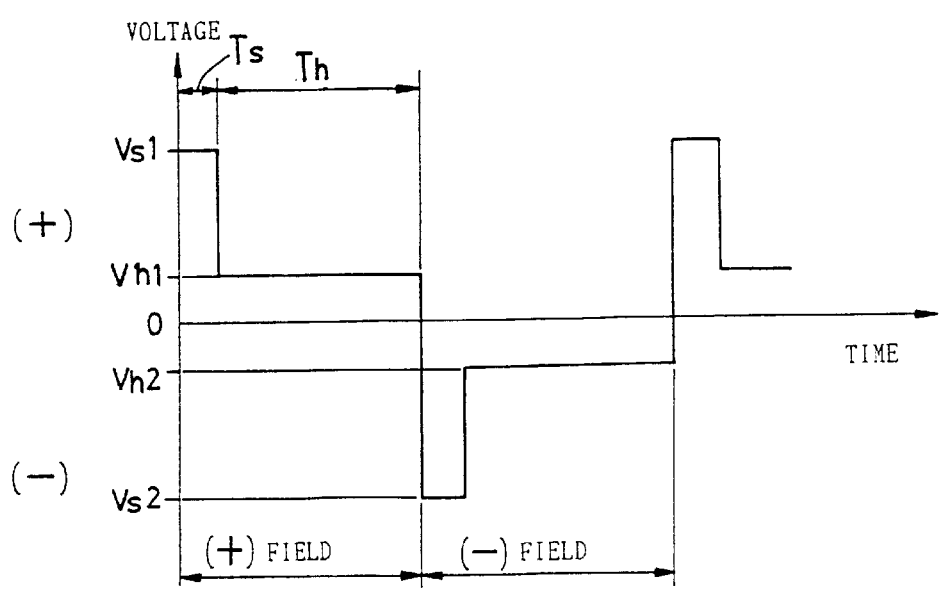

Referring to FIG. 5, an example of the waveform of a voltage applied to the signal electrode 9 of the liquid crystal display is described hereafter.

Voltages applied in a select period Ts and a hold period Th are denoted Vs1 and Vh1, respectively, in a (+) electric field, and Vs2 and Vh2, respectively, in a (−) electric field. Since the nonlinear resistance elements have a symmetrical current-voltage characteristic, the absolute value of the voltage Vs1 can be made equal to that of the voltage Vs2, and also the absolute value of the voltage Vh1 equal to that of the voltage Vh2.

As is evident from the foregoing description, the nonlinear resistance elements of the liquid crystal display constituted according to this embodiment of the invention obtain the symmetrical current-voltage characteristic.

Consequently, a d-c voltage component of a voltage applied to a liquid crystal layer during driving can be nearly eliminated and the waveform of a voltage applied to the signal electrode can be made symmetrical.

As a result, the d-c voltage component applied between the signal electrode and the display electrodes as well as between the signal electrode and the opposite electrodes disappears, and the occurrence of the after-image phenomenon posing a problem with displaying images can be prevented. Thus the liquid crystal display capable of displaying images of excellent quality is obtained.

Now a method of manufacturing the active substrate of the liquid crystal display as shown in FIGS. 1 and 2 is described with reference to FIGS. 6 to 9. FIGS. 6 to 9 are plan views illustrating steps in sequence of the method of manufacturing the active substrate of the liquid crystal display according to the first embodiment of the invention.

Figure 6:
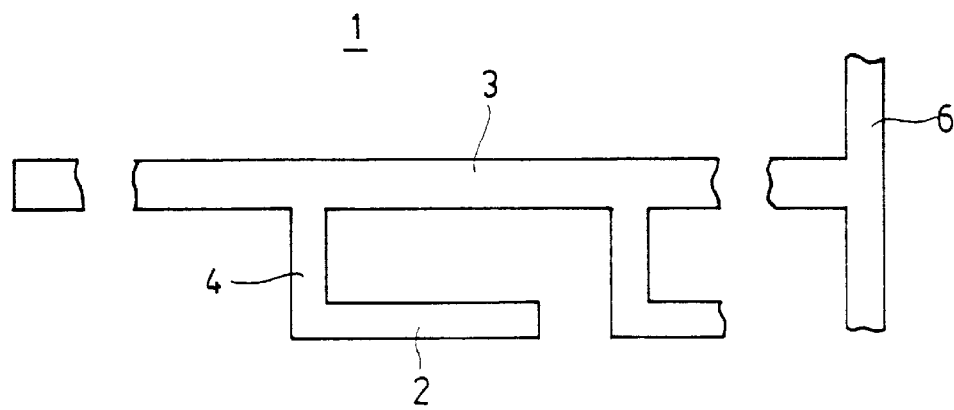
FIG. 6 is a plan view illustrating an initial step of a method of manufacturing the liquid crystal display according to the first embodiment of the invention.

Firstly, as shown in FIG. 6, a metal film made of tantalum (Ta) is formed to a thickness of 250 nm on the entire surface of the first substrate 1, which is the active substrate made of glass, by the sputtering method.

Then, a photosensitive resin (not shown) is formed on the entire surface of the tantalum film using a roll coater, a pattern is formed on the photosensitive resin by photolithographic techniques using a predetermined photo mask, and using the patterned photosensitive resin as an etching mask, the tantalum film is etched by the photo-etching method, forming the lower electrodes 2, the anodic oxidation electrode 3 connected with the lower electrodes 2 via the connection portions 4, and the common electrode 6 connected with the anodic oxidation electrode 3.

Herein the etching of the tantalum film is carried out by use of the reactive ion etching system (hereinafter referred to as "RIE").

The etching is carried out using a mixture of sulfur hexafluoride ($SF_6$) gas and oxygen ($O_2$) gas under a condition of $SF_6$ flow rate at 100~200 sccm, $O_2$ flow rate at 10~40 sccm, and pressure at $4~12\times10^{-2}$ torr with power consumption of 0.2~0.5 $kW/cm^2$.

Thereafter, the anodic oxidation method is applied to the tantalum film using the common electrode 6 as an anode, and an aqueous solution containing 0.01~1.0 wt % of citric acid or ammonium borate as an anodic oxidation electrolyte and by applying a voltage at 10–20V.

Thereupon, the insulation film composed of a tantalum oxide ($Ta_2O_5$) film is formed to a thickness of 35 nm on the lower electrodes 2, the anodic oxidation electrode 3, and the surfaces of the sidewall and topwall of the connection portions 4.

Figure 7:
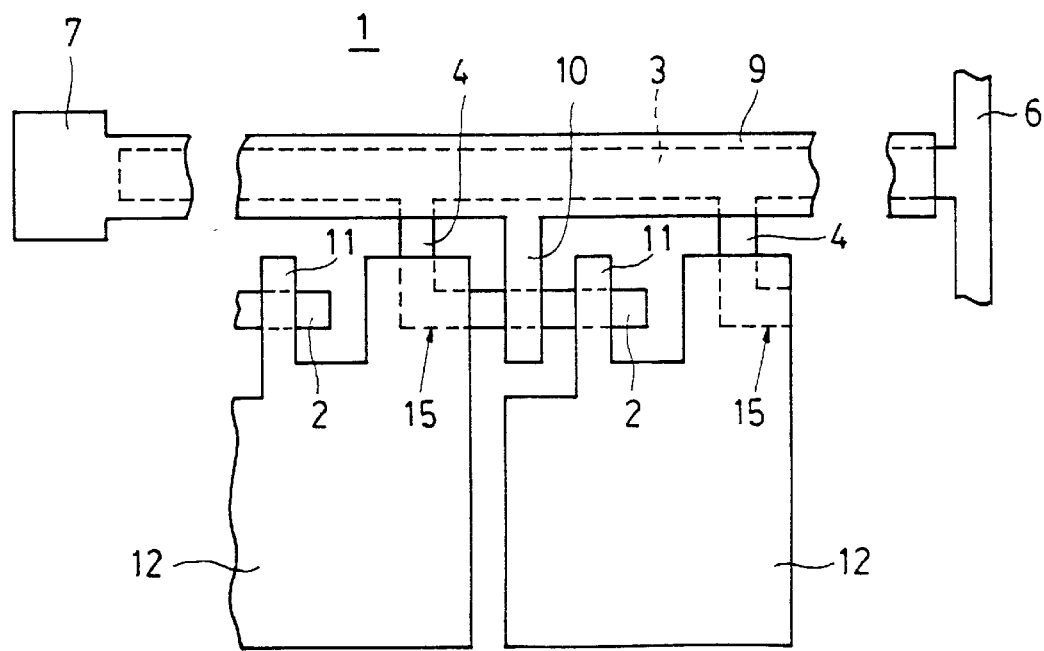
FIGS. 7 and 8 are plan views illustrating intermediate steps of the same, and FIG. 9 a plan view showing completion of a final step of the same.

Then, as shown in FIG. 7, the indium tin oxide (ITO) film as a transparent and electrically conductive film is formed to a thickness of 100 nm on the entire surface of the first substrate 1 by use of the sputtering system. Thereafter, a photosensitive resin is formed on the indium tin oxide film.

In the next step, by etching the indium tin oxide film, a pattern is formed simultaneously for the display electrodes 12, the second upper electrode 11 connected with one of the display electrodes 12, the signal electrode 9, the first upper electrode 10 connected with the signal electrode 9, and the input terminal 7 connected with the signal electrode 9.

Hereupon, a patterning on the indium tin oxide film is formed such that the input terminal 7 is completely covered with the indium tin oxide film and extended to the left side in FIG. 7, and the tantalum film on the common electrode 6 is exposed.

The etching of the indium tin oxide film is carried out by use of the wet etching system using an aqueous solution of ferric oxide and hydrochloric acid as an etchant at a temperature set in the range of 30~40° C.

As shown in the plan view of FIG. 7, parts of regions for the display electrodes 12 cover parts of a region for each of the connection portions 4. Regions where the display electrodes 12 are partially overlapped with the connection portions 4 are denoted as overlapping portions 15.

Figure 8:
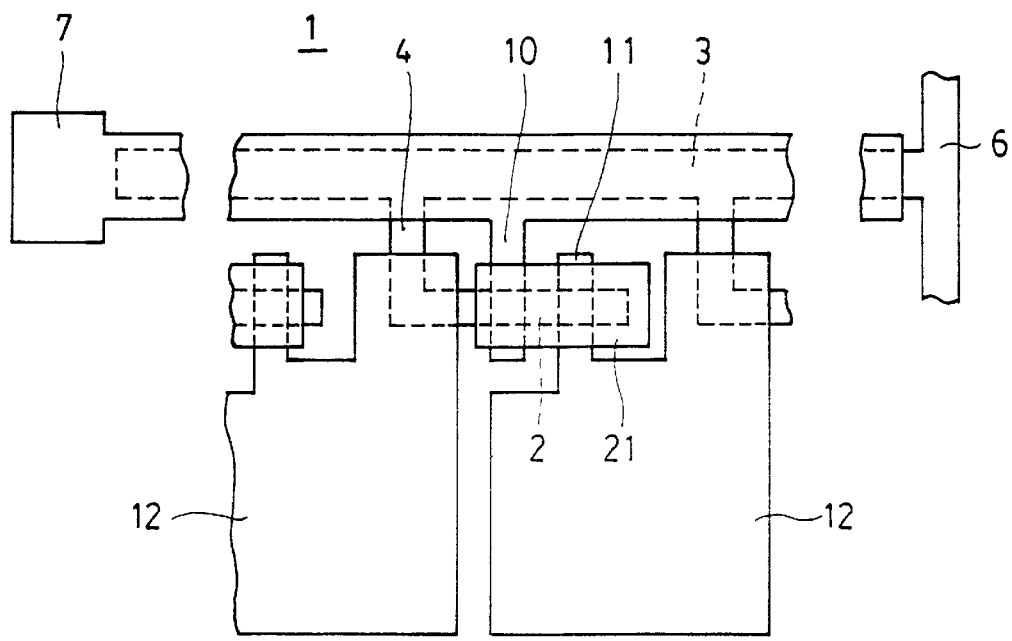

Then as shown in FIG. 8, photosensitive resin is applied to the entire surface and a photosensitive resin 21 covering the first upper electrode 10 and the second upper electrode 11 is formed by the photolithographic techniques using a predetermined photo mask.

And the etching of the connection portion 4 connecting the anodic oxidation electrode 3 with the common electrode 6 and also the connection portion 4 connecting the lower electrode 2 with the display electrodes 12, in regions protruding from the display electrodes 12, is carried out by use of the RIE system using the display electrodes 12 and the photosensitive resin 21 as etching masks.

The etching is carried out using a mixture of sulfur hexafluoride ($SF_6$) gas and oxygen ($O_2$) gas under a condition of $SF_6$ flow rate at 100~200 sccm, $O_2$ flow rate at 10~40 sccm, and pressure at $4~12\times10^{-2}$ torr with power consumption of 0.2~0.5 $kW/cm^2$.

Under the etching condition described above, only the tantalum film of the connection portions 4 and the tantalum oxide film of the insulation film 8 are removed, hardly etching the indium tin oxide film.

Figure 9:
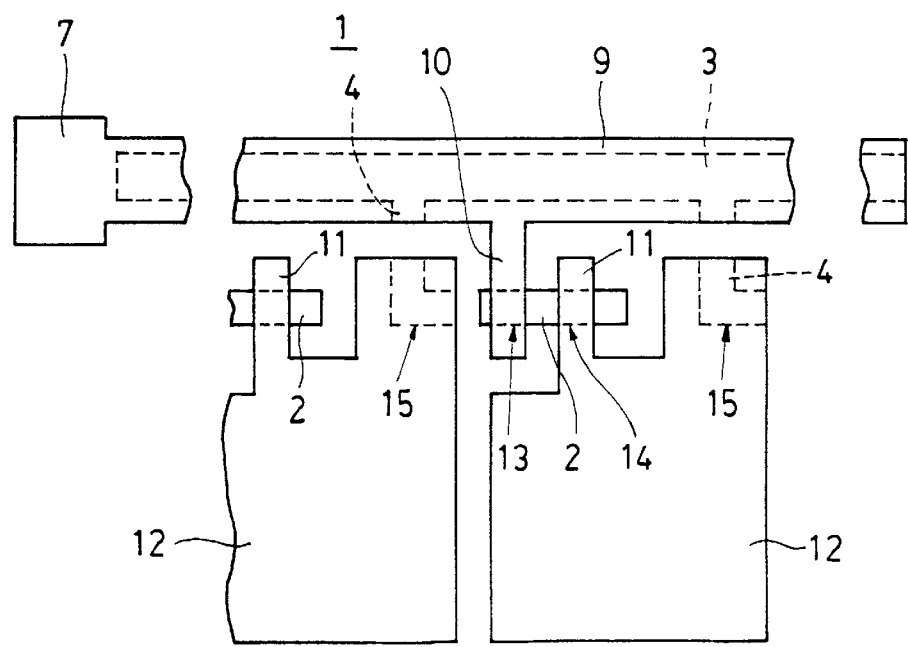

As shown in FIG. 9, by the etching process described above, the connection portions 4 between the anodic oxidation electrode 3 and the display electrodes 12 are split, separating the former from the latter, the common electrode 6 is. removed, and the connection portions 4 between the display electrodes 12 and the lower electrodes 2 are split, separating the former from the latter.

As shown in FIGS. 9 and 2, by steps of processing described in the foregoing, the first nonlinear resistance element 13 comprising each of the lower electrodes 2, resembling an island in shape and separated from the anodic oxidation electrode 3, the insulation film 8 formed on the aforesaid lower electrode 2, and the first upper electrode 10 connected with the signal electrode 9 is formed.

Further, the second nonlinear resistance element 14 comprising each of the lower electrodes 2, resembling an island in shape, the insulation film 8 formed on the aforesaid lower electrode 2, and the second upper electrode 11 is formed.

Then, the signal electrode 9 is formed such that one end thereof is connected with the input terminal 7.

Driving signals applied from the external circuit are impressed on the display electrodes 12 through a route of "the input terminal 7—the signal electrode 9—the first nonlinear resistance element 13—the second nonlinear resistance element 14".

Each of the display electrodes 12 is provided with an overlapping portion 15 partially overlapping with each of the connection portions 4 composed of the tantalum film and substantially resembling the letter L in shape.

In this manufacturing method, the connection portions 4 are processed by the etching system using the photosensitive resin 21 and the display electrodes 12 as etching masks so that the connection portions 4 can be formed so as to match the underside region for the display electrodes 12.

Since the etching process is applied using the photosensitive resin 21 formed so as to cover the first upper electrode 10 and the second upper electrode 11 as an etching mask, the lower electrodes 2 each resembling an island in shape can be formed.

Herein, the first nonlinear resistance element 13 and the second nonlinear resistance element 14, provided in a region between the signal electrode 9 and the display electrodes 12, comprise "an indium tin oxide film—a tantalum oxide film—a tantalum film" structure and "a tantalum film—a tantalum oxide film—an indium tin oxide film" structure, respectively.

This means that an electric current path is provided between the signal electrode 9 and each of the display electrodes 12 such that electric current flows from "the indium tin oxide film—the tantalum oxide film—the tantalum film" of the first nonlinear resistance element 13 to "the tantalum film—the tantalum oxide film—the indium tin oxide film" of the second nonlinear resistance element 14.

As a result, connection from the signal electrode 9 to each of the display electrodes 12 at one of the nonlinear resistance elements, and connection from the aforesaid display electrode 12 to the signal electrode 9 at the other of the nonlinear resistance elements become structurally symmetrical to each other.

By adoption of the method of manufacturing the active substrate, described in the first embodiment of the invention, the nonlinear resistance elements having an excellent symmetrical characteristic can be manufactured.

As a result, the d-c voltage component applied to a liquid crystal layer disappears and the occurrence of the after-image phenomenon posing a problem with displaying images can be prevented while the display electrodes can be utilized as an etching mask.

Accordingly, in a step of separating the anodic oxidation electrode 3 from the lower electrodes 2, it is sufficient only to form the photosensitive resin 21 on the upper surfaces of the first nonlinear resistance element 13 and the second nonlinear resistance element 14.

As a result, it has become possible to relax requirement for accuracy in positioning a region for the photosensitive resin 21 from that in the past. Furthermore, separation of the connection portions 4 from the lower electrodes 2 as well as from the anodic oxidation electrode 3 is ensured. Thus the liquid crystal display capable of displaying images of excellent quality is obtained.

Second Embodiment

Referring to FIGS. 10 to 15, the structure of a first substrate for forming thereon nonlinear resistance elements of a liquid crystal display according to a second embodiment of the invention and the method of manufacturing the same are described hereafter.

Figure 12:
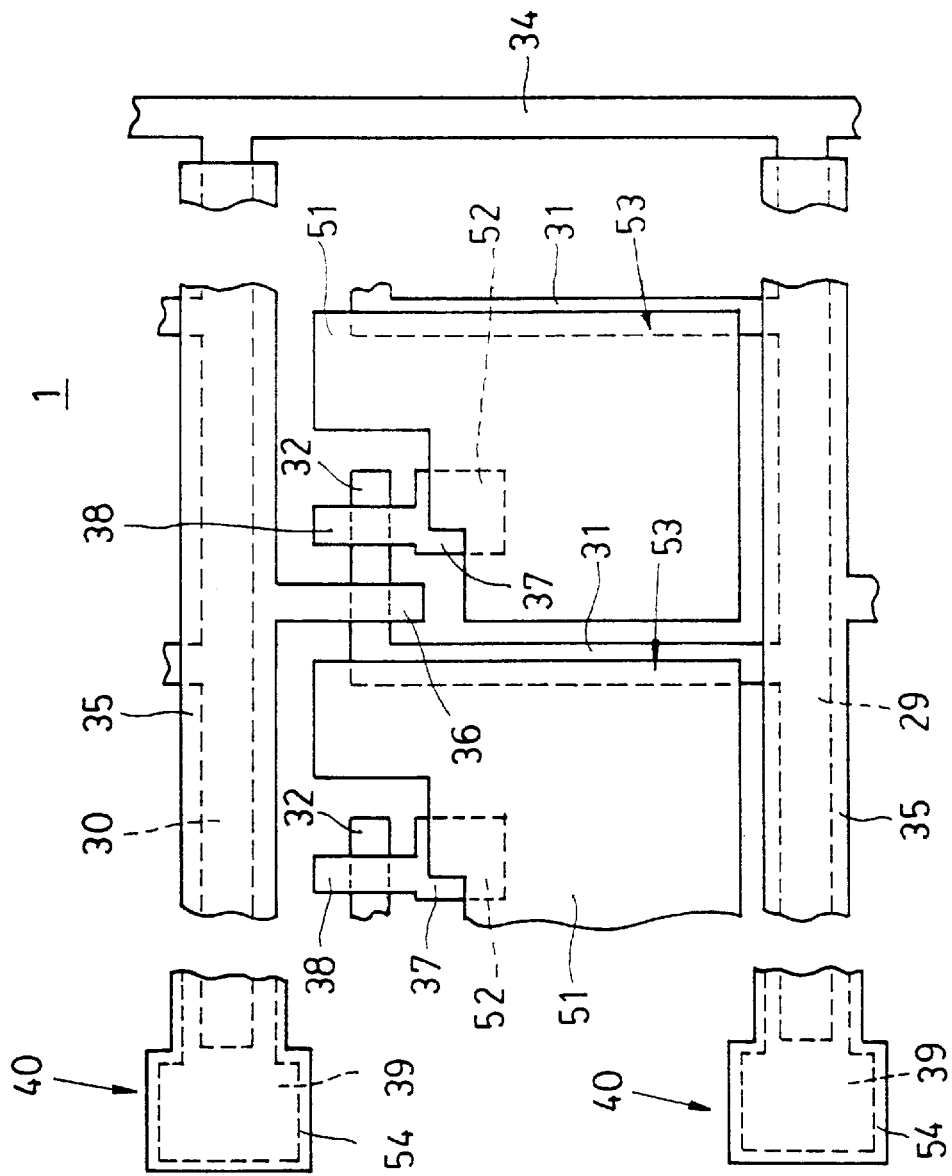
Figure 13:
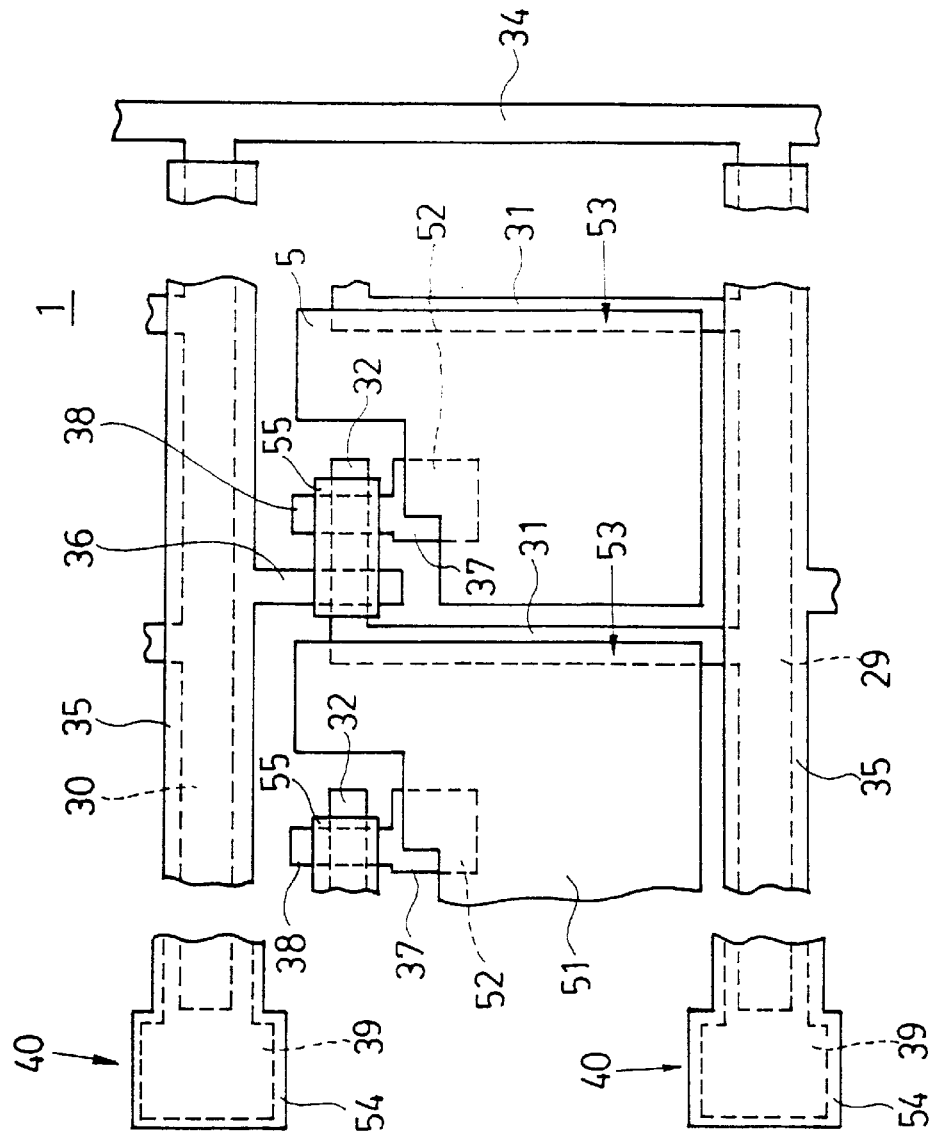
Figure 14:
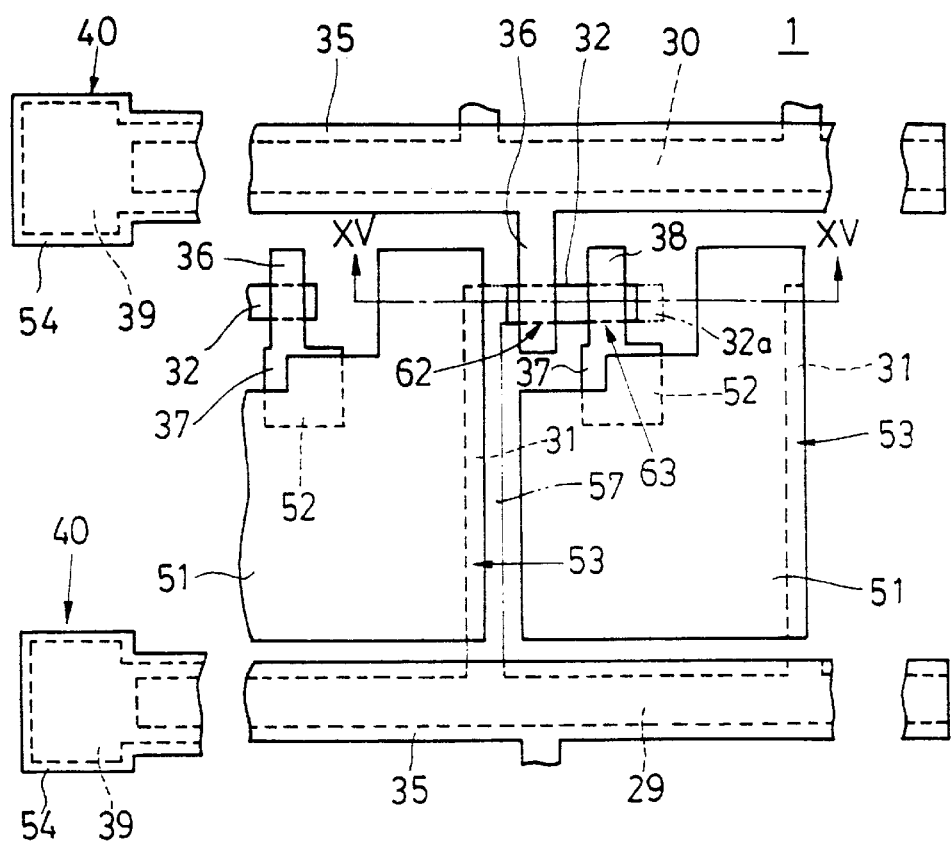
Figure 15:
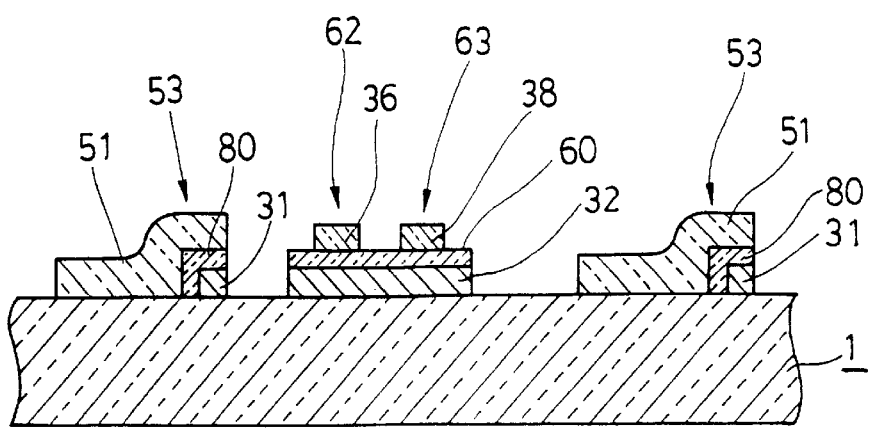
FIG. 15 is an expanded sectional view taken along the line XV—XV of FIG. 14.

FIGS. 10 to 14 are plan views showing steps of manufacturing the liquid crystal display according to the second embodiment of the invention and FIG. 15 is an expanded view taken along the line XV—XV in FIG. 14.

Firstly, the constitution of the liquid crystal display according to the second embodiment is described with reference to FIGS. 14 and 15.

A nonlinear resistance element portion provided between the signal electrode 35 and the display electrodes 51 comprises a first nonlinear resistance element 62 composed of a first upper electrode 36 made of a chromium film, an insulation film 60 made of a tantalum oxide film, and a lower electrode 32 made of a tantalum film.

Also the nonlinear resistance element portion comprises a second nonlinear resistance element 63 composed of the lower electrode 32 made of the tantalum film, the insulation film 60 made of the tantalum oxide film, and a second upper electrode 38 made of the chromium film.

One end of respectively anodic oxidation electrodes 29 and 30 is connected with a common electrode, and the other end thereof with input terminals 40.

The insulation film 60 made of the tantalum oxide film formed by processing the lower electrodes 32 by the anodic oxidation method is provided on the surface of the lower electrodes 32.

Further, a chromium film as a metal film is formed on the upper surface of respectively the anodic oxidation electrodes 29 and 30 constituting signal electrodes 35 composed of a double layer film made of the tantalum film and the chromium film.

Each of the signal electrodes 35 is provided with an extended portion crossing each of the lower electrodes 32 and serving as the first upper electrode 36 provided on the aforesaid lower electrode 32.

The second upper electrode 38 crossing the aforesaid lower electrode 32 and disposed thereon is connected with each of the display electrodes 51 via a pad 37. The second upper electrode 38 is composed of the chromium film. The display electrodes 51 are composed of a transparent and electrically conductive film such as an indium tin oxide film.

As shown in FIGS. 12 and 13, connection portions 31 connecting the lower electrodes 32 with the anodic oxidation electrode 29 are provided with overlapping portions 53 where the display electrodes 51 are partially overlapped with the connection portions 31. The insulation film 60 is interposed between the display electrodes 51 and the connection portions 31.

Each of the overlapping portions 53 has a width about half as wide as the width of each of the connection portions 31, and a part of the connection portion 31, protruding from the region of the display electrode 51, is denoted as an exposed region 57.

As shown in FIG. 14, the lower electrodes 32 each resembling an island in shape are separated from the anodic oxidation electrode 29 by removing the exposed region 57 after the display electrodes 51 are formed.

Further, in each of the input terminals 40, an input electrode 39 made of an chromium film, and an input electrode 54 for connection, made of a transparent and electrically conductive film, are provided.

Consequently, the first nonlinear resistance element 62 provided between the signal electrode 35 and each of the display electrodes 51 has a structure consisting of "chromium film—tantalum oxide film—tantalum film" while the second nonlinear resistance element 63 has a structure consisting of "tantalum film—tantalum oxide film—chromium film".

As a result, connection from the signal electrode 35 to each of the display electrodes 51 at one of the nonlinear resistance elements, and connection from the aforesaid display electrode 51 to the signal electrode 35 at the other of the nonlinear resistance elements becomes symmetrical to each other in structure.

Accordingly, the nonlinear resistance element portion having an excellent symmetrical characteristic is obtained, eliminating thereby a d-c voltage component impressed on a liquid crystal layer. Thus the occurrence of the after-image phenomenon posing a problem with the image quality of display can be prevented.

Referring to FIGS. 14 and 15, the method of manufacturing the liquid crystal display according to the second embodiment is described in detail hereafter.

Figure 10:
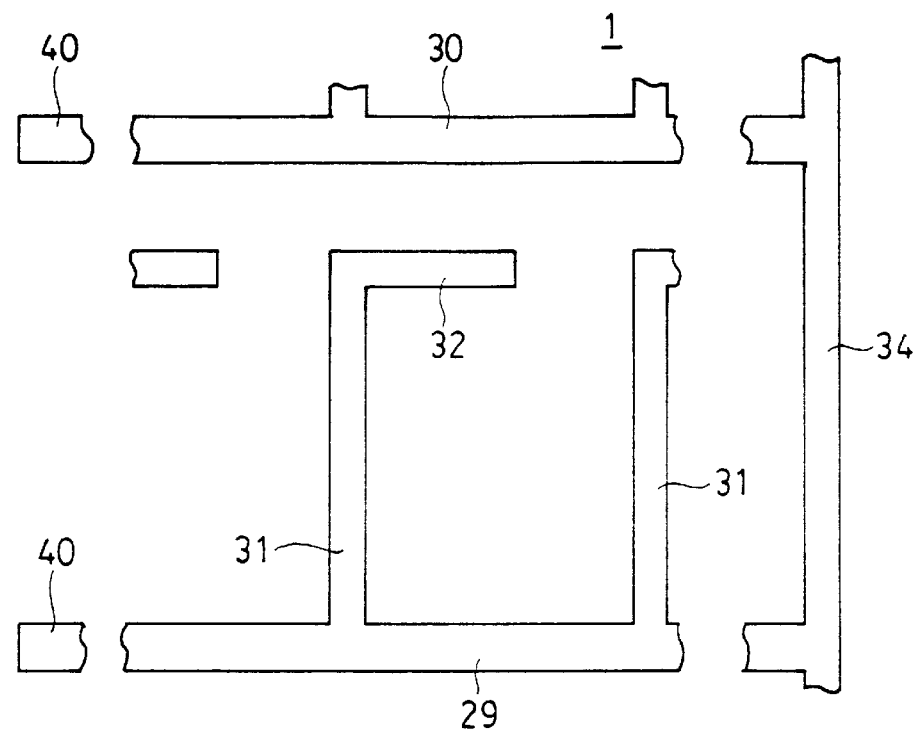
FIG. 10 is a plan view showing an initial step of processing for illustrating a liquid crystal display according to a second embodiment of the invention, and a method of manufacturing the same.

As shown in FIG. 10, a tantalum (Ta) film as a metal film is formed to a thickness of 100 nm on a first substrate 1 made of glass by use of the sputtering system. Thereafter a photosensitive resin (not shown) is formed on the tantalum film.

Then by means of an etching process using the photosensitive resin film as an etching mask, patterns are formed for the lower electrodes 32, the anodic oxidation electrode 29 connected with one of the lower electrodes 32 via the connection portion 31, the common electrode 34 connected with the anodic oxidation electrodes 29 and 30, and the input terminals 40 for inputting scanning signals sent out from the external circuit, all of which are composed of the tantalum film. The etching of the tantalum film is carried out by use of the RIE system under the etching condition described in the foregoing.

FIG. 10 shows the anodic oxidation electrode 30 corresponding a n-th scanning electrode and the anodic oxidation electrode 29 corresponding to a (n+1)th scanning electrode.

In the second embodiment of the invention, the lower electrode 32 composing the n-th nonlinear resistance element portion is connected with the (n+1)th anodic oxidation electrode 29 via the connection portion 31.

Thereafter, the anodic oxidation method is applied to the tantalum film using the common electrode 34 as an anode, an aqueous solution containing 0.01~1.0 wt % of citric acid or ammonium borate as an anodic oxidation electrolyte and by applying a voltage at 10–20V.

Thereupon, the insulation film composed of a tantalum oxide ($Ta_2O_5$) film is formed to a thickness of 35 nm on the lower electrodes 32 and the anodic oxidation electrodes 29 and 30, and the surfaces of the sidewall and topwall of the connection portions 31.

Figure 11:
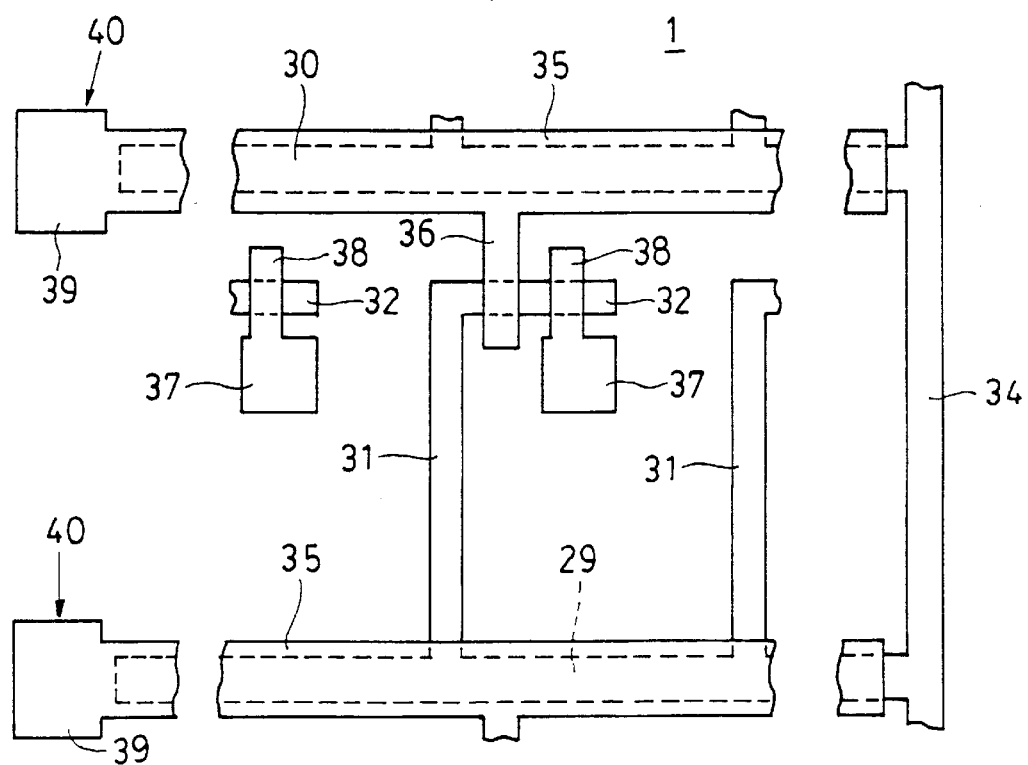
FIGS. 11 to 14 are plan views respectively illustrating intermediate and final steps of the same.

Then, as shown in FIG. 11, the chromium (Cr) film is formed to a thickness of 50 nm on the upper surface of the first substrate 1 and the insulation film 60 by use of the sputtering system. Thereafter, a photosensitive resin is formed on the chromium film.

In the next step, by applying the etching process using the photosensitive resin as an etching mask, each of the signal electrodes 35, both made of the chromium film, is formed respectively on the anodic oxidation electrodes 29 and 30, and a pattern is formed for the first upper electrode 36 connected with one of the signal electrodes 35 and the second upper electrode 38 having a pad 37 connected with each of the display electrodes 51.

Hereupon, the signal electrodes 35 are connected with the input electrodes 39 in the input terminals 40, and the chromium film is not formed on the common electrode 34.

The etching of the chromium film is carried out by the wet etching process using an aqueous solution of perchloric acid and ammonium cerium nitrate as an etchant at a temperature set in the range of 20~30° C.

Thereafter, as shown in FIG. 12, an indium tin oxide (ITO) film as a transparent and electrically conductive film is formed to a thickness of 100 nm and then, on the surface of the indium tin oxide film, a photosensitive resin is formed.

By means of the etching process using the photosensitive resin as an etching mask, the n-th display electrode 51 connected with the n-th signal electrode 35 composed of the indium tin oxide film via the nonlinear resistance element portion is formed.

Patterns of the display electrodes 51 are formed such that the overlapping portion 53 where a part of the region of the connection portion 31 connecting each of the lower electrodes 32 with the anodic oxidation electrode 29 overlaps partially each of the display electrode 51 and another overlapping portion 52 where the pad 37 extended from the second upper electrode 38 is overlapped partially with the aforesaid display electrode 51.

Further, as shown in FIG. 12, a pattern of the input electrode 54 for connection is formed to cover the anodic oxidation electrode 30 in the input terminal 40 at the same time when the display electrodes are patterned.

As shown in FIG. 13, a photosensitive resin 55 is formed by photolithographic techniques in such a way as to cover the first upper electrode 36, the second upper electrode 38, and each of the lower electrodes 32.

Thereafter, as shown in FIG. 14, the connection portion 31 for connection among the common electrode 34, the (n+1)-th anodic oxidation electrode 29, and each of the lower electrodes 32, in an exposed region (as indicated by the phantom line in FIG. 14) other than the overlapping portion 53 is removed by the etching process using the display electrodes 51 and the photosensitive resin 55 as etching masks.

Hereupon, the lower electrodes 32 each resembling an island in shape are formed by separating the connection portion 31 from respectively the anodic oxidation electrode 29 and the lower electrodes 32 by the etching process.

At the same time, each of the lower electrodes 32 in an exposed region 32a (as indicated by the phantom line) not covered by the photosensitive resin 55, on the opposite side of the connection portion 31, is also removed by the etching process. In this connection, the photosensitive resin film 55 may be patterned not to have the exposed region 32a.

Thus the first nonlinear resistance element 62 comprising the lower electrode 32 resembling an island in shape, separated from the (n+1)-th anodic oxidation electrode 29, the insulation film 60, and the first upper electrode 36 connected with the n-th signal electrode 35 is formed.

Also, the second nonlinear resistance element 63 comprising the lower electrode 32 resembling an island in shape, the insulation film 60, and the second upper electrode 38 connected with the n-th display electrode 51 via the pad 37 is formed.

Further, one end of each of the signal electrodes 35 is connected with each of the input terminals 40. In each of the input terminals 40, n input electrode 39 composed of the chromium film formed on the anodic oxidation electrode 29 or 30, and an input electrode 54 for connection, composed of a transparent and electrically conductive film formed on the input electrode 39, can be formed.

External signals are applied on one of the display electrodes 51 via the input portion 40—the signal electrode 35—the first nonlinear resistance element 62—the second nonlinear resistance element 63.

As shown in FIGS. 14 and 15, each of the display electrodes 51 is provided with the overlapping portion 53 overlapping with the connection portion 31 connecting each of the lower electrodes 32 with the anodic oxidation electrode 29 or 30.

When removing the connection portion 31 by the etching process, the display electrodes 51 are used as etching masks. Accordingly, the connection portion 31 is split in the exposed region (as indicated by the phantom line in FIG. 14) where it is not overlapped with the display electrodes 51 so that the lower electrode 32 resembling an island in shape can be formed.

With adoption of the method of manufacturing the active substrate according to the second embodiment of the invention, the nonlinear resistance elements having an excellent symmetrical characteristic can be manufactured.

Thus the d-c component of a voltage applied on the liquid crystal layer is eliminated, preventing the occurrence of the after-image phenomenon which poses a problem with the quality of images displayed while the display electrodes 51 can be utilized as etching masks.

Accordingly, as shown in FIG. 13, when separating the anodic oxidation electrode 29 from the lower electrode 32, it is sufficient to only form the photosensitive resin 55 in a region over the two upper electrodes 36 and 38, and one of the lower electrodes 32. This has made it possible to relax requirements for accuracy in positioning a region for the photosensitive resin film 55 from the same in the past.

Furthermore, as a part of the connection portion 31, still remaining under the display electrode 51, is composed of a metal film, it can therefore shield light.

Accordingly, the remaining part of the connection portion 31 can used as a shielding against light when used in a transmissive liquid crystal display, enabling partial shielding of light on the first substrate composing the nonlinear resistance element portion.

Third Embodiment

Figure 16:
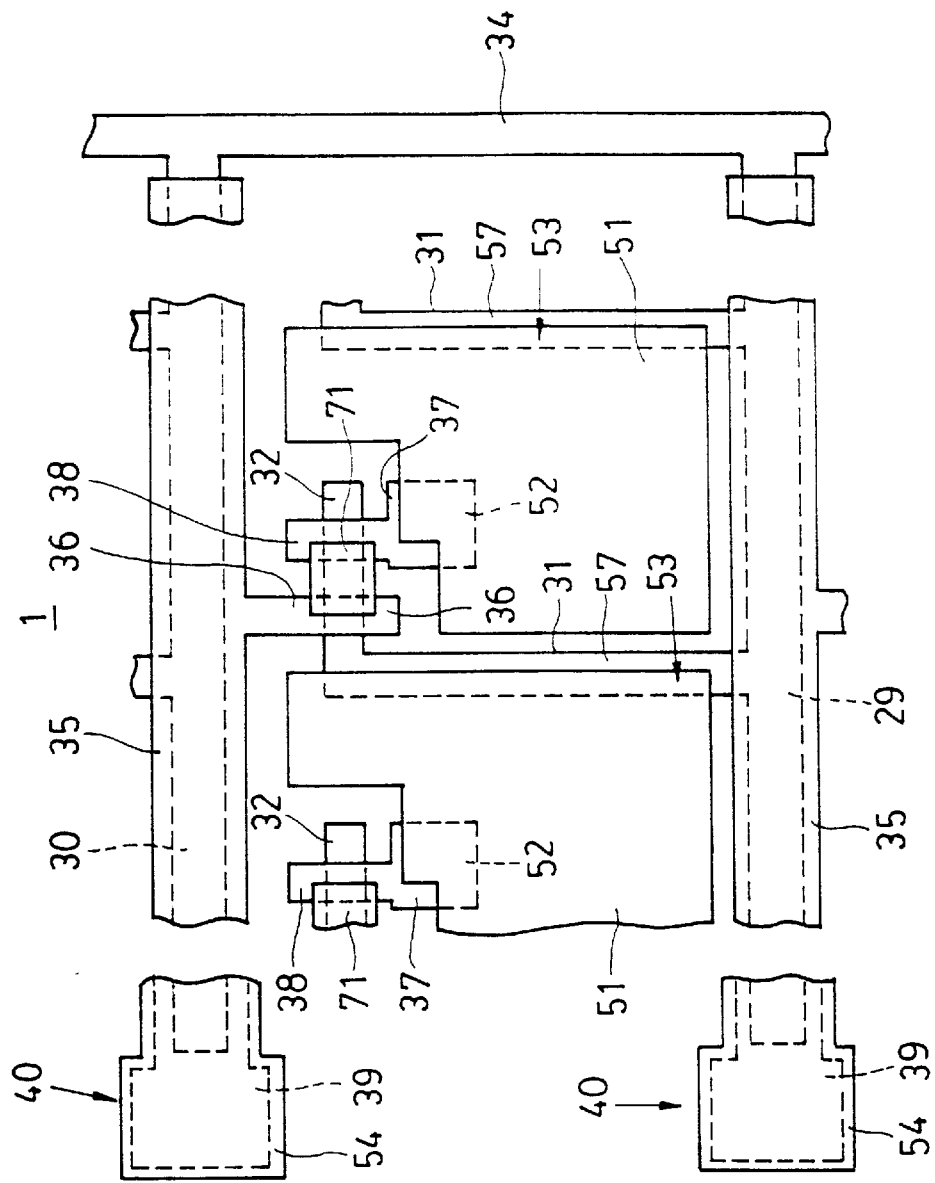
FIGS. 16 and 17 are plan views respectively showing intermediate and final steps for illustrating a liquid crystal display according to a third embodiment of the invention, and a method of manufacturing the same.
Figure 17:
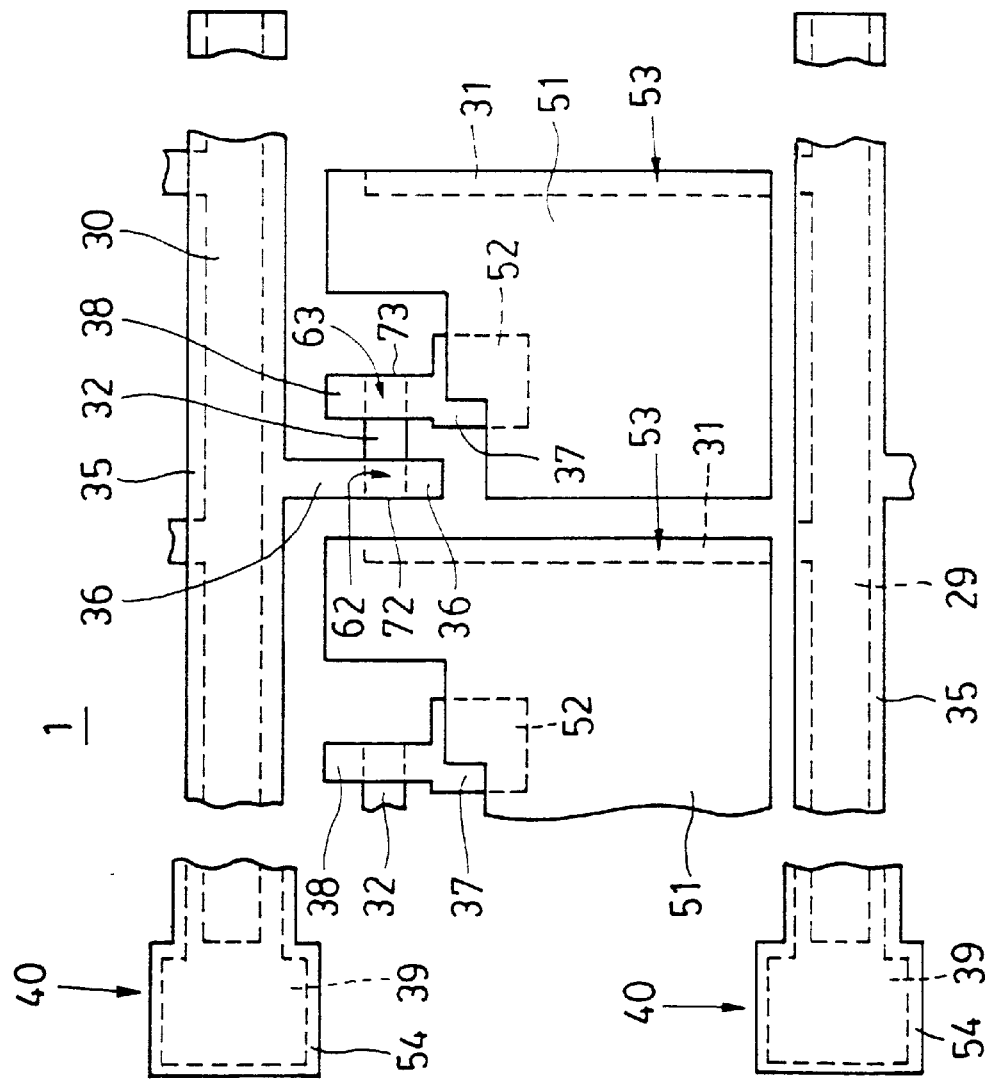

Referring to FIGS. 16 and 17, the structure of the liquid crystal display according to a third embodiment of the invention and the method of manufacturing the same are described hereafter.

FIGS. 16 and 17 are plan views showing a part of the region of the liquid crystal display for describing the structure of the liquid crystal display according to the third embodiment of the invention and the method of manufacturing the same, corresponding to respectively FIGS. 13 and 14 used for describing the second embodiment of the invention.

Firstly, the structure of the liquid crystal display according to the third embodiment of the invention is described with reference to FIG. 17.

A nonlinear resistance element portion disposed between one of signal electrodes 35 and each of display electrodes 51 comprises a first nonlinear resistance element 62 composed of a first upper electrode 36 made of a chromium film, an insulation film made of a tantalum oxide film, and each of lower electrodes 32 made of a tantalum film.

Also, the nonlinear resistance element portion comprises a second nonlinear resistance element 63 composed of the aforesaid lower electrode 32 made of the tantalum film, the insulation film 60 made of the tantalum oxide film, and a second upper electrode 38 made of the chromium film.

As shown in FIG. 16, the lower electrode 32 is connected with one of anodic oxidation electrodes 29 via one of connection portions 31, and parts of the lower electrode 32, in regions outside the first upper electrode 36 and the second upper electrode 38, are removed such that the opposite ends thereof are flush with the external side of the two upper electrodes 36 and 38, respectively.

However, a middle part of each of the lower electrodes 32, between the first upper electrode 36 and the second upper electrode 38, is left intact.

One end of each of the anodic oxidation electrodes 29 and 30, is connected with a common electrode 34, and the other end with each of the input terminals 40.

An insulation film composed of a tantalum oxide film formed by the anodic oxidation of the lower electrodes 32 is provided on the surfaces of the lower electrodes 32.

Further, a chromium film is formed on the upper surface of each of the anodic oxidation electrodes 29 and 30, constituting signal electrodes 35 composed of a double layer film consisting of the tantalum film and the chromium film.

One of the signal electrodes 35 is provided with an extended portion crossing each of the lower electrodes 32 and serving as the first upper electrode 36 disposed on the lower electrode 32.

The second upper electrode 38 crossing each of the lower electrodes 32 and disposed on the lower electrode 32 is connected with each of the display electrodes 51 via a pad 37. The second upper electrode 38 is also composed of the chromium film. The display electrodes 51 are composed of a transparent and electrically conductive film made of indium tin oxide and the like.

Each of connection portions 31 connecting the lower electrodes 32 with the anodic oxidation electrodes 29 is provided with an overlapping portion 53 partially overlapped by each of the display electrodes 51. However, an insulation film is interposed between the display electrodes 51 and the connection portions 31.

The overlapping portion 53 is as wide as about a half of the width of the connection portion 31, and a part of the connection portion 31, in a region exposed from the display electrode 51 as shown in FIG. 16, is denoted as an exposed region 57.

By removing the exposed region 57 after the display electrodes 51 are formed, the lower electrode 32 resembling an island in shape is separated from the anodic oxidation electrode 29.

Furthermore, in each of the input terminals 40, an input electrode 39 composed of a chromium film and an input electrode 54 for connection, composed of a transparent and electrically conductive film, are provided.

As a result, the first nonlinear resistance element 62 provided between one of the signal electrodes 35 and one of the display electrodes 51 has a structure consisting of a chromium film—a tantalum oxide film—a tantalum film while the second nonlinear resistance element 63 has a structure consisting of a tantalum film—a tantalum oxide film—a chromium film.

Accordingly, connection from the signal electrode 35 to each of the display electrodes 51 at one of the nonlinear resistance elements, and connection from the aforesaid display electrode 51 to the signal electrode 35 at the other of the nonlinear resistance elements become structurally symmetrical to each other.

Consequently, the nonlinear resistance elements having an excellent symmetrical characteristic are obtained and a d-c voltage component impressed on a liquid crystal layer during driving can be eliminated, preventing the occurrence of the after-image phenomenon posing a problem with displaying images.

Now referring to FIGS. 16 and 17, the method of manufacturing the liquid crystal display according to the third embodiment of the invention is described.

Firstly, a tantalum (Ta) film is formed to a thickness of 100 nm on the entire surface of a first substrate made of an insulator by use of the sputtering system. Thereafter a photosensitive resin (not shown) is formed on the tantalum film.

Then, by means of the etching process, patterns are formed for the lower electrodes 32, the anodic oxidation electrode 29 connected with one of the lower electrodes 32 via the connection portion 31, the other anodic oxidation electrode 30, the common electrode 34 connected with the anodic oxidation electrodes 29 and 30, and the input terminals 40 for inputting scanning signals sent out from the external circuit. The etching of the tantalum film is carried out by use of the RIE system.

FIG. 16 shows the anodic oxidation electrode 30 representing a n-th scanning electrode and the anodic oxidation electrode 29 representing a (n+1)-th scanning electrode. In this embodiment of the invention, the lower electrode 32 of the n-th nonlinear resistance element is connected with the (n+1)-th anodic oxidation electrode 29 via the connection portion 31.

Thereafter, the anodic oxidation method is applied to the tantalum film using the common electrode 34 as an anode, and an aqueous solution containing citric acid or ammonium borate as an anodic oxidation electrolyte.

Thereupon, the insulation film composed of a tantalum oxide $Ta_2O_5$) film is formed to a thickness of 35 nm on the lower electrodes 32, the anodic oxidation electrodes 29 and 30, and the surfaces of the sidewall and topwall of each of the connection portions 31.

Then, a chromium (Cr) film is formed to a thickness of 50 nm on the surfaces of a first substrate and the insulation film by use of the sputtering system. Then, a photosensitive resin is formed on the tantalum film.

Thereafter, by means of the etching method applied to the chromium film, a pattern is formed on the anodic oxidation electrodes 29 and 30, for the signal electrodes 35, the first upper electrode 36 connected with one of the signal electrodes 35, and the second upper electrode 38 having a pad 37 connected with each of the display electrodes 51.

At the same time, the input electrode 39 made of a chromium film is formed such that the signal electrode 35 is connected with the input electrode 39 in each of the input terminals 40. At this time, the chromium film is not formed on the common electrode 34.

In the next step, an indium tin oxide (ITO) film as a transparent and electrically conductive film is formed on the entire surface to a thickness of 100 nm by means of the sputtering method. Thereafter, a photosensitive resin film is formed on the indium tin oxide film.

Then, using the photosensitive resin as an etching mask, the etching of the indium tin oxide film is carried out by use of the RIE system, and a pattern is formed for the n-th display electrode 51 connected with the n-th signal electrode 35 via the nonlinear resistance element.

Furthermore, by means of the photo etching method, a pattern is formed such that each of the display electrodes 51 is provided with an overlapping portion 53 where the display electrode 51 overlaps a part of the region for the connection portion 31 connecting each of the lower electrodes 32 with the anodic oxidation electrode 29, and also with an overlapping portion 52 where the display electrode 51 overlaps a part of the region for the pad 37 of the second upper electrode 38.

At this time, the overlapping portion 53 is so formed as to have a width about half of that of the connection portion 31, and a part of the connection portion 31, in a region exposed from the display electrode 51, is denoted as an exposed region 57.

At the same time, by patterning on the transparent and electrically conductive film, the input electrodes 54 for connection, covering the anodic oxidation electrodes 29 and 30, are formed in the input terminals 40.

Thereafter, a pattern is formed by photolithographic techniques for a photosensitive resin 71 in such a way to cover about half of the region for the first upper electrode 36 over the lower electrode 32, about half of the region for the second upper electrode 38, and a part of the lower electrode 32 in a region between the first upper electrode 36 and the second upper electrode 38.

Then, by means of the etching method with the RIE system using the photosensitive resin film 55 and the display electrodes 51 as etching masks, the exposed region 57 of the connection portion 31 connecting together the common electrode 34, the (n+1)-th anodic oxidation electrode 29, and the lower electrode 32 is removed as shown in FIG. 17.

When the etching method is applied as above, the photosensitive resin 71, the display electrodes 51, the first upper electrode 36, and the second upper electrode 38 serve as etching masks.

Accordingly, owing to a side 72 on the left hand of the first upper electrode 36 and a side 73 on the right hand of the second upper electrode 38, the lower electrode 32 and the insulation film are formed to match self-alignment with respectively the first upper electrode 36 and the second upper electrode 38.

With adoption of the method of manufacturing the first substrate composing the MIM element according to the third embodiment of the invention as described above, nonlinear resistance elements having an excellent symmetrical characteristic can be manufactured.

Accordingly, a d-c voltage component impressed on the liquid crystal layer can be eliminated while the display electrodes 51 can be used as etching masks.

Therefore, when separating the anodic oxidation electrodes 29 and 30 from the lower electrode 32, it is sufficient to only form the photosensitive resin 71 over the first upper electrode 36, the second upper electrode 38, and an upper surface of the lower electrode 32 between the first upper electrode 36 and the second upper electrode 38.

Furthermore, it is unnecessary to cover the entire surface of the respective first upper electrode 36 and the second upper electrode 38 with the photosensitive resin 71. As a result, it has become possible to relax requirements for accuracy in positioning a region for the photosensitive resin 71 from that in the past.

In addition, part of the connection portion 31, remaining intact under the display electrode 51, is made of a metal film and able to shield light. Accordingly, when the liquid crystal display is used as a transmissive liquid crystal display, the remaining part of the connection portion 31 can be used as a shielding against light so that partial shielding of light on the substrate composing the nonlinear resistance elements becomes possible.

Fourth Embodiment

Figure 18:
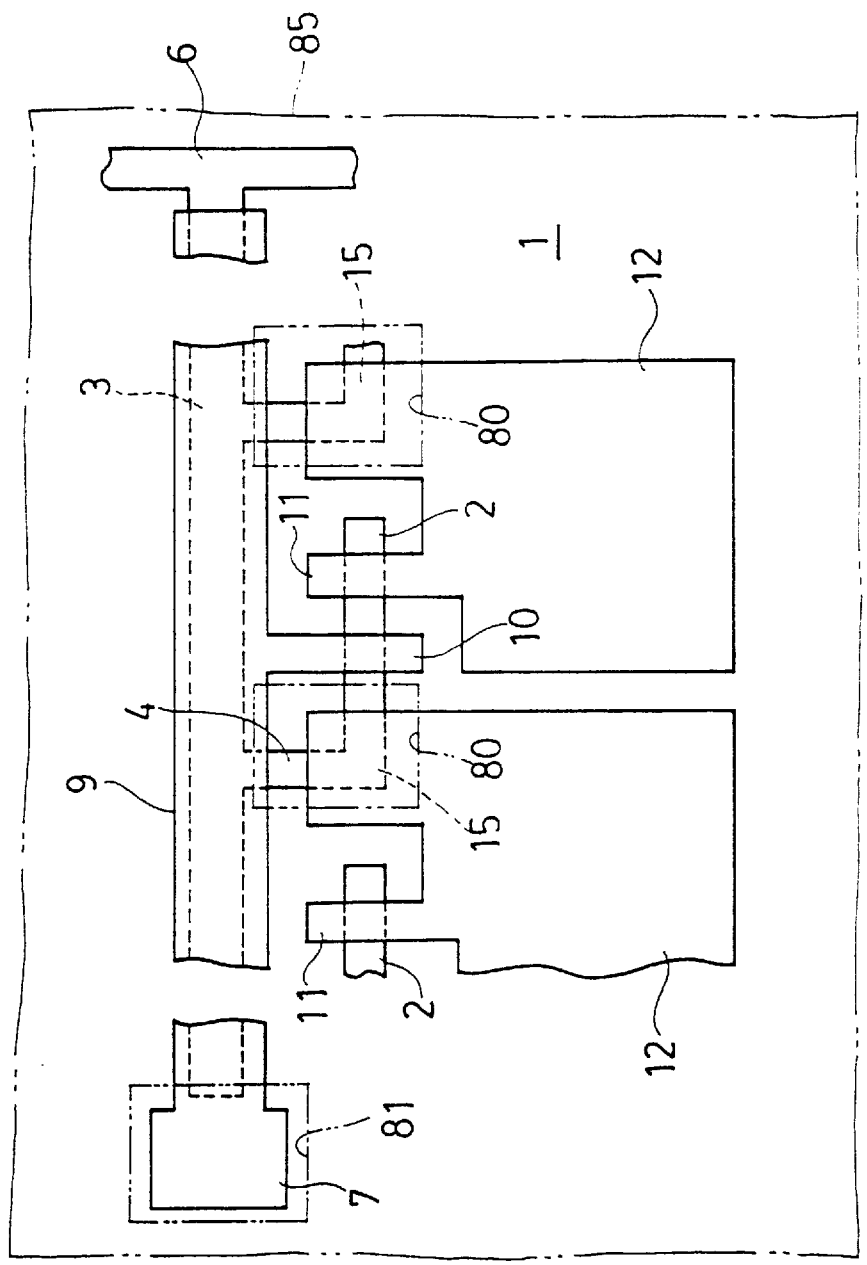
FIGS. 18 to 19 are plan views respectively showing intermediate and final steps for illustrating a liquid crystal display according to a fourth embodiment of the invention, and a method of manufacturing the same
Figure 19:
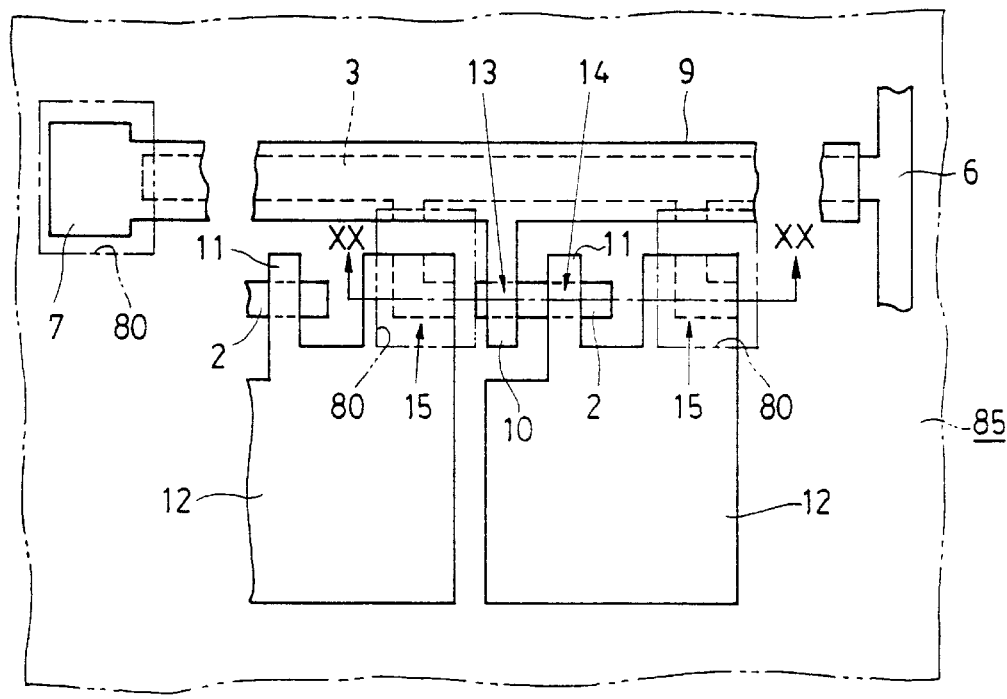
Figure 20:
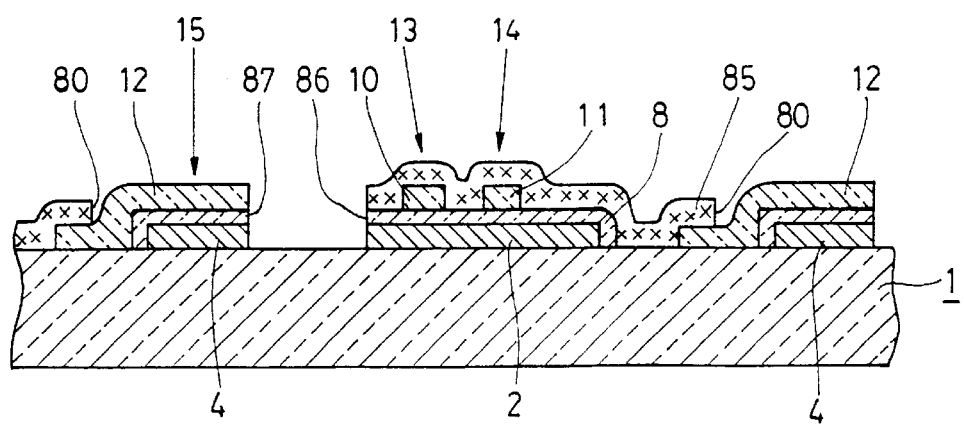
FIG. 20 is an expanded sectional view taken along the line XX—XX of FIG. 19.

Now, the structure of the liquid crystal display according to a fourth embodiment of the invention and the method of manufacturing the same are described hereafter with reference to FIGS. 18 to 20.

Firstly, the structure of the liquid crystal display according to the fourth embodiment is described.

An anodic oxidation electrode 3, lower electrodes 2, and connection portions 4 all of which are composed of a metal film made of tantalum (Ta) containing nitrogen (N), are formed on a first substrate 1, that is, an active substrate on which nonlinear resistance elements are formed.

One end of the anodic oxidation electrode 3 is connected with a common electrode 6, and the other end with an input terminal 7 for applying signals from an external circuit to the nonlinear resistance elements. The common electrode 6 is used as an electrode for forming an insulation film 8 by means of the anodic oxidation method.

Further, as shown in FIG. 20, the insulation film 8 composed of a nitrogen-bearing tantalum oxide ($Ta_2O_5$: N) film formed by the anodic oxidation of the lower electrodes 2 is provided on each of the lower electrodes 2.

Then, a transparent and electrically conductive film serving as a signal electrode 9 is formed on the anodic oxidation electrode 3. A first upper electrode 10 connected with the signal electrode 9 and a second upper electrode 11 connected with each of display electrodes 12 are provided on each of the lower electrodes 2.

The first upper electrode 10 and the second upper electrode 11 are provided on the lower electrode 2 with the insulation film 8 interposed in between. The lower electrode 2, the insulation film 8, and the first upper electrode 10 constitute a first nonlinear resistance element 13, and the lower electrode 2, the insulation film 8, and the second upper electrode 11 constitute a second nonlinear resistance element 14.

Herein, the signal electrode 9, the first upper electrode 10, the second upper electrode 11, and the display electrodes 12 are composed of a transparent and electrically conductive film, for example, an indium tin oxide (ITO) film.

Further, the signal electrode 9 for connection with an external circuit is connected with the input terminal 7.

Each of the display electrodes 12 is provided with an overlapping portion partially overlapping with each of the connection portions 4 connecting the anodic oxidation electrode 3 with each of the lower electrodes 2, in a region substantially resembling the letter L.

A part of each of the connection portions 4, between each of the lower electrodes 2 and each of the display electrodes 12, and the same between the anodic oxidation electrode 3 and each of the display electrodes 12 are removed, forming each of the lower electrodes 2, resembling an island in shape.

Then, an overcoating insulation film 85 is formed on the entire surface of the aforesaid electrodes and the connection portions 4, and openings 80 and 81 are provided on the overcoating insulation film 85 such that the overlapping portions 15 and the input terminal 7 are exposed.

In this embodiment, the first nonlinear resistance element 13 and the second nonlinear resistance element 14, provided in a region between the signal electrode 9 and the display electrodes 12, are composed of "an indium tin oxide film—a nitrogen-bearing tantalum oxide film—a nitrogen-bearing tantalum film" and "a nitrogen-bearing pantalum film—a nitrogen-bearing tantalum oxide film—an indium tin oxide film", respectively.

This means that an electric current path is provided between the signal electrode 9 and each of the display electrodes 12 such that electric current flows from "the indium tin oxide film—the nitrogen-bearing tantalum oxide film—the nitrogen-bearing tantalum film" of the first nonlinear resistance element 13 to "the nitrogen-bearing tantalum film—the nitrogen-bearing tantalum oxide film—the indium tin oxide film" of the second nonlinear resistance element 14.

As a result, connection from the signal electrode 9 to each of the display electrodes 12 at one of the nonlinear resistance elements, and connection from the aforesaid display electrode 12 to the signal electrode 9 at the other of the nonlinear resistance elements becomes symmetrical to each other.

Now, the method of manufacturing the liquid crystal display according to the fourth embodiment of the invention is described hereafter.

As shown in FIG. 18, a nitrogen(N)-bearing tantalum (Ta) film is formed on the entire surface of the first substrate 1 to a thickness of 250 nm by the sputtering method. Thereafter, a photosensitive resin is formed on the nitrogen-bearing tantalum film.

Then a pattern is formed for the anodic oxidation electrode 3, the lower electrodes 2, and the connection portions 4 connecting the anodic oxidation electrode 3 with the lower electrodes 2, all of which are composed of a nitrogen-bearing tantalum film, by the photo etching method using the photosensitive resin as an etching mask. The etching of the nitrogen-bearing tantalum film is carried out by use of the RIE system.

One end of the anodic oxidation electrode 3 is connected with the common electrode 6 and the other end with the terminal 7 for applying signals from the external circuit on the nonlinear resistance elements.

Thereafter, an insulation film 8 composed of a nitrogen-bearing tantalum ($Ta_2O_5$: N) film is formed on the surface of each of the lower electrodes 2 by the anodic oxidation method using the common electrode 6 as an electrode.

Then, an indium tin oxide (ITO) film as a transparent and electrically conductive film is formed on the entire surface to a thickness of 100 nm by the sputtering method. Subsequently, a photosensitive resin is formed on the indium tin oxide film for patterning.

The signal electrode 9 formed on the anodic oxidation film 3, the first upper electrode 10 connected with the signal electrode 9, the display electrodes 12 and the second upper electrode 11 connected with each of the display electrodes 12 are provided by applying the etching method to the indium tin oxide film.

Thereby each of the lower electrodes 2, the insulation film 8, and the first upper electrode 10 constitute the first nonlinear resistance element 13, and the aforesaid lower electrode 2, the insulation film 8, and the second upper electrode 11 constitute the second nonlinear resistance element 14.

The first nonlinear resistance element 13 and the second nonlinear resistance element 14 constitute a nonlinear resistance element portion.

The first upper electrode 10, the second upper electrode 11, the signal electrode 9, and the display electrodes 12 are all made of a transparent and electrically conductive film, for example, an indium tin oxide (ITO) film, or a thin metal film.

Further, the signal electrode 9 for connection with the external circuit is connected with the input terminal 7.

Each of the display electrodes 12 is provided with the overlapping portion 15 where the aforesaid display electrode partially overlaps each of the connection portions 4 connecting the anodic oxidation electrode 3 with each of the lower electrodes 2.

In the next step, a tantalum oxide film serving as an overcoating insulation film for the nonlinear resistance element portion is formed on the entire surface to a thickness of 150 nm by the sputtering method.

Then a photosensitive resin is formed on the tantalum oxide film, and patterning on the photosensitive resin is provided by photolithographic techniques using a predetermined photo mask such that openings in the photosensitive resin correspond to the openings 80 and 81.

Then, by etching the tantalum oxide film using the photosensitive resin as an etching mask, the openings 80 and 81 are formed in a region for the overlapping portion 15 where each of the connection portions 4 is partially overlapped with each of the display electrodes 12, and a region for the input terminal 7, respectively.

The etching of the tantalum oxide film is carried out with the RIE system using a mixture of carbon tetrafluoride ($CF_4$) at a flow rate of 200~240 sccm and oxygen ($O_2$) at a flow rate of 10~40 sccm under condition of pressure at $4~12 \times 10^{-2}$ torr and power consumption at 0.2~0.5 kW/cm².

As shown in FIG. 19, using each of the display electrodes 12 as well as the photosensitive resin film as etching masks, the lower electrodes 2 each resembling an island in shape are formed by removing parts of each of the connection portions 4 connecting the anodic oxidation electrode 3 with each of the lower electrodes 2, exposed in each of the openings 80.

In this embodiment, an overcoating insulation film 85 is formed in a region including the nonlinear resistance element portion. The overcoating insulation film 85 is provided with the opening 81 and the opening 80 used for separating each of the connection portions connecting each of the lower electrodes 2 with the anodic oxidation electrode.

Thus each of the connection portions 4 is split by the etching method using the photosensitive resin for forming the opening 80 of the overcoating insulation film 85 and the display electrodes 12 as etching masks.

Accordingly, as shown in FIG. 20, the lower electrode 2 and the insulation film 8, constituting the nonlinear resistance element, are provided with a side 86 matching with the opening 80.

Similarly, the connection portion 4 and the insulation film 8 are provided with a side 87, respectively, flush with the edge of the display electrode 12.

As is evident from the description above, the nonlinear resistance element provided between the signal electrode 9 and the display electrodes 12 comprises the first nonlinear resistance element 13 composed of "an indium tin oxide film—a nitrogen-bearing tantalum oxide film—a nitrogen-bearing tantalum film" and the second non-linear resistance element 14 composed of "a nitrogen-bearing tantalum film—a nitrogen-bearing tantalum oxide film—an indium tin oxide film".

As a result, connection from the signal electrode 9 to each of the display electrodes 12 at one of the nonlinear resistance elements, and connection from the aforesaid display electrode 12 to the signal electrode 9 at the other of the nonlinear resistance elements become structurally symmetrical to each other.

Accordingly, by adoption of the fourth embodiment of the invention, the nonlinear resistance elements having a symmetrical current-voltage characteristic can be obtained.

Therefore, a d-c voltage component applied on a liquid crystal layer during driving operation is nearly eliminated, and the waveform of a voltage applied on the signal electrode can be made symmetrical.

Consequently, a d-c voltage component is applied neither between the signal electrode 9 and the display electrodes 12 nor between the signal electrode 9 and opposite electrodes, preventing the occurrence of the after-image phenomenon that poses a problem with displaying images.

Therefore, a liquid crystal display having an excellent display quality is obtained. Furthermore, by forming the overcoating insulation film 85 on the nonlinear resistance elements, variation with time in the performance of the nonlinear resistance elements can be held to a minimum.

As the formation of the overcoating insulation film 85 requires removal thereof at the input terminal 7 for connection with the external circuit, the opening 81 is provided.

Also, in this embodiment, it is unnecessary to form an etching mask additionally for separating the connection portion 4 between each of the lower electrodes 2 and the anodic oxidation electrode 3, and a separating process is much simplified.

Other Embodiment

Figure 21:
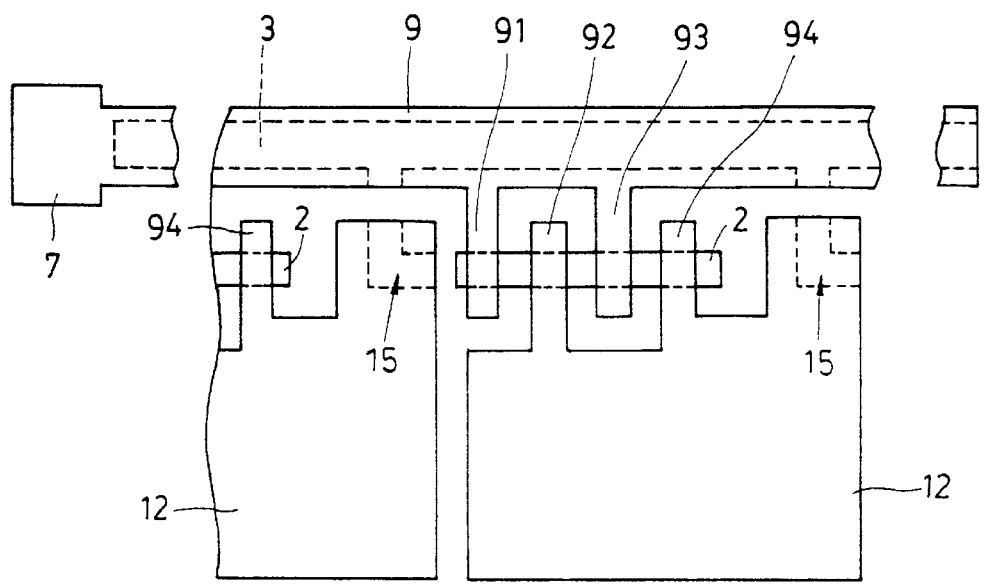
FIGS. 21 and 22 are plan views of a portion of a liquid crystal display according to a variation of the embodiments of the invention, constituting nonlinear resistance elements thereof.
Figure 22:
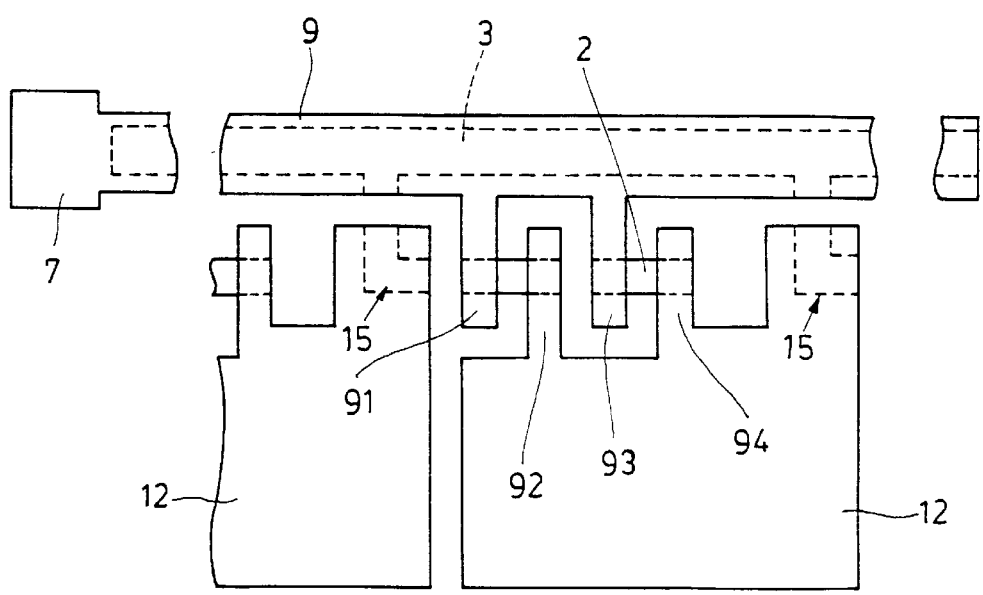

Now, referring to FIGS. 21 and 22, a liquid crystal display according to an embodiment different from the first through the fourth embodiment of the invention is described hereafter.

An constitution as shown in FIGS. 21 and 22 is different from that of the liquid crystal display according to the first through the fourth embodiment of the invention only with respect to the number of the upper electrodes.

In the embodiment as shown in FIGS. 21 and 22, four upper electrodes, that is, a first upper electrode 91, a second upper electrode 92, a third upper electrode 93, and a fourth upper electrode 94 are provided to cross one of the lower electrodes 2 thereon while two upper electrodes are provided in the first through the fourth embodiment.

In the embodiment as shown in FIG. 21, the first upper electrode 91 and the third upper electrode 93 are connected with the signal electrode 9 while the second upper electrode 92 and the fourth upper electrode 94 are connected with the display electrodes 12.

This means that in this constitution, the first upper electrode 91 and the third upper electrode 93 are connected in parallel, and the second upper electrode 92 and the fourth upper electrode 94 are connected in parallel. Then, upper electrodes connected in parallel are connected with in series other upper electrodes connected in parallel.

The liquid crystal display as shown in FIG. 21 has an effect of compensating for malfunctioning of the nonlinear resistance element portion due to a break occurring therein in addition to the effect of reducing a d-c voltage component of a voltage applied, attributable to the asymmetrical current-voltage characteristic so that display without the after-image phenomenon is obtained, as described in the foregoing.

In the constitution shown in FIG. 22, the first upper electrode 91, the second upper electrode 92, the third upper electrode 93, and the fourth upper electrode 94 are connected in series.

And, the liquid crystal display as shown in FIG. 22 has an effect of allowing the insulation film on respective nonlinear resistance elements to be made thinner in addition to the effect of reducing a d-c voltage component of a voltage applied, attributable to the asymmetrical current-voltage characteristic, so that display without the after-image phenomenon is obtained, as described in the foregoing.

Further, in FIGS. 21 and 22, the embodiment wherein four upper electrodes are provided is described. However, six or more upper electrodes may be provided as long as the upper electrodes are in an even number. The method of manufacturing the liquid crystal display according to the first through the fourth embodiment may be applied for manufacturing the other embodiment described above.

In the aforesaid embodiments of the invention, examples wherein indium tin oxide (ITO) is used for the transparent and electrically conductive film are described. Alternatively, other oxides such as indium oxide ($In_2O_3$), tin oxide ($SnO_2$), zinc oxide (ZnO) or the like may be used.

Also, examples wherein tantalum or tantalum containing nitrogen is used for the lower electrode are described. Alternatively, a metal film made of tantalum containing carbon, silicon, niobium, or aluminum may be used.

Further, in the second and the third embodiments, an example wherein a chromium film is used for the upper electrode is described. Again, alternatively, a metal film other than the chromium film such as a chromium film containing titanium, tungsten, titanium silicide, tungsten silicide, or nitrogen may be used as well.

Fifth Embodiment

Figure 23:
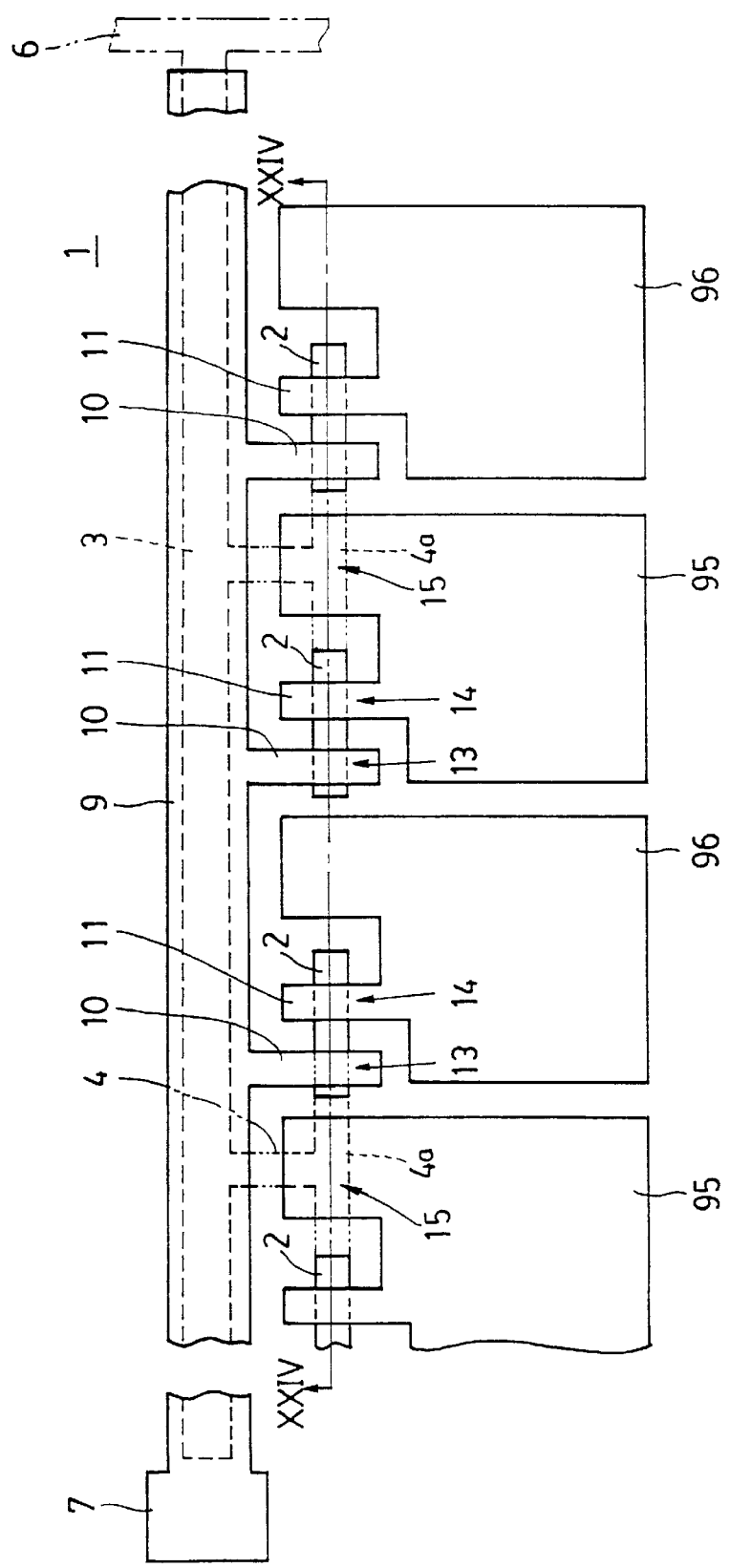
FIG. 23 is a plan view of a portion constituting nonlinear resistance elements of a liquid crystal display according to a fifth embodiment of the invention, and FIG. 24 a sectional view taken along the line XXIX—XXIX of FIG. 23.
Figure 24:
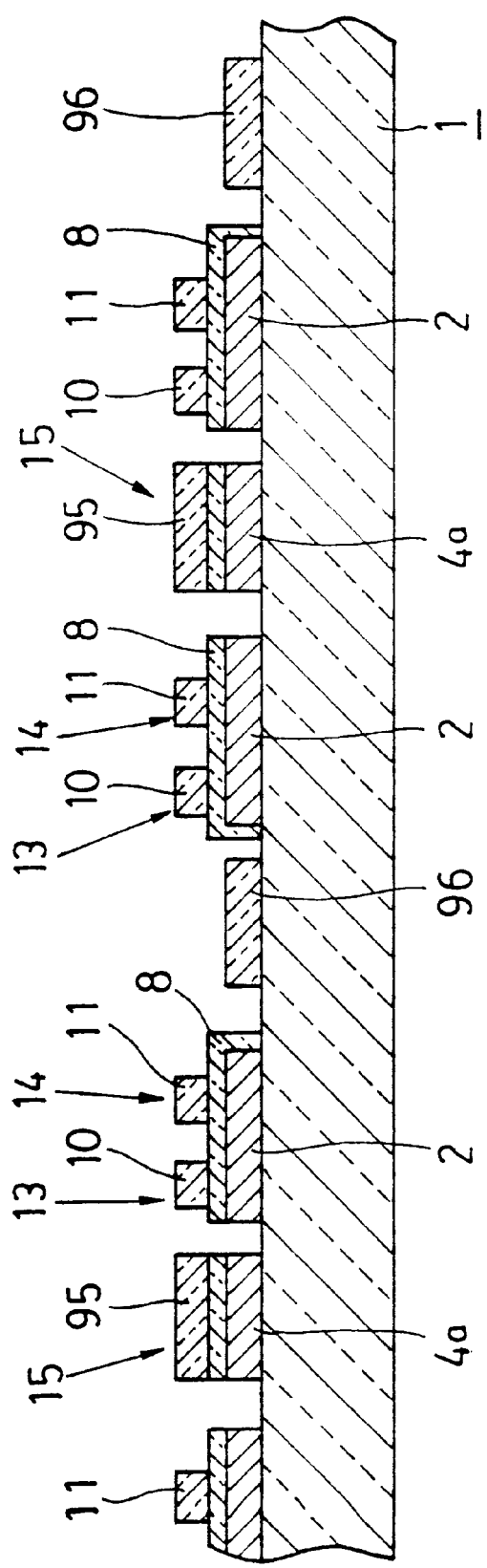

Referring to FIGS. 23 and 24, a fifth embodiment of the invention is described hereafter.

FIG. 23 is a plan view showing a part of a region for a first substrate on which nonlinear resistance elements (MIM elements) of a liquid crystal display according to the fifth embodiment of the invention. FIG. 24 is a sectional 1 view taken along the line XXIV—XXIV of FIG. 23. Referring to said figures, the constitution of the liquid crystal according to this embodiment is described hereafter.

Anodic oxidation electrodes 3, lower electrodes 2, connection portions 4, each connecting each of the anodic oxidation electrode 3 with two lower electrodes 2 and 2, all of which are composed of a metal film made of tantalum, are provided on a transparent substrate 1 of active substrate on which the nonlinear resistance elements are formed. Each of the connection portions 4 is provided with a T-shaped part 4a where an overlapping portion 15, resembling the letter T in shape, is formed under each of display electrodes 95 described hereafter.

One end of each of the anodic oxidation electrodes 3 is connected with a common electrode 6, and the other end with an input terminal 7 for applying signals from an external circuit on the nonlinear resistance elements. The common electrode 6 serves as an electrode when the anodic oxidation method is applied to the surface of each of the lower electrodes 2 for forming an insulation film 8 thereon.

Now, arrangement of the anodic oxidation electrodes 3, the overlapping portions 15, the lower electrodes 2, and the connection portions 4 is described.

As shown in FIG. 23, each of the overlapping portions 15, resembling the letter T in shape, provided underneath each of the display electrodes 95 is connected with the anodic oxidation electrode 3 via each of the connection portions 4 on one side of the T-shaped part 4a, and with the two lower electrodes 2 via the connection portion 4 on two sides of the T-shaped part 4a crossing the aforesaid one side thereof at right angles. Further, a plurality of the anodic oxidation electrodes 3 are connected with each other via the common electrode 6 in an external region.

In the construction adopted for the liquid crystal display, a part of each of the connection portions 4, between the signal electrode 9 and the display electrode 95, and other parts thereof between the T-shaped part 4a and the two lower electrodes 2 are separated.

The connection portion 4 between the signal electrode 9 and the display electrode 95 has one side substantially matching with the display electrode 95, and the connection portions 4 between the overlapping portion 15 resembling the letter T in shape and the two lower electrodes 2 have also sides substantially matching with the display electrode 95. Further, the common electrode 6 connected with the signal electrode 9 is also separated from the signal electrode 9.

Regions indicated by dash and double dotted lines covering the connection portion 4 between the anodic oxidation electrode 3 opposite the signal electrode 9 and the display electrode 95 provided with the overlapping portion 15, the connection portions 4 between the overlapping portion 15 resembling the letter T in shape and the two lower electrodes 2, and the common electrode 6 show the condition of an intermediate step in a process of manufacturing the liquid crystal display.

Further, the display electrode 95 provided with the overlapping portion 15 and the display electrode 96 without the overlapping portion 15 are alternately disposed against the signal electrode 9.

The insulation film 8 composed of a tantalum oxide ($Ta_2O_5$) film formed by applying the anodic oxidation method to the lower electrode 2 is provided on the surface of the lower electrode 2.

A transparent and electrically conductive film is formed on each of the anodic oxidation electrodes 3 and is used as the signal electrode 9. A first upper electrode 10 connected with the signal electrode 9, and a second upper electrode 11 connected with the display electrode 95 are provided on each of the lower electrodes 2 so as to cross the lower electrode 2.

The first upper electrode 10 and the second upper electrode 11 are provided on the aforesaid lower electrode 2 resembling an island in shape with the insulation film 8 interposed in-between.

A first nonlinear resistance element 13 is composed of the lower electrode 2, the insulation film 8 and the first upper electrode 10, and a second nonlinear resistance element 14 is composed of the lower electrode 2, the insulation film 8 and the second upper electrode 11.

Herein the signal electrodes 9, the first upper electrodes 10, the second upper electrodes 11 and the display electrodes 95 are all composed of a transparent and electrically conductive film, for example, an indium tin oxide (ITO) film.

Further the signal electrodes 9 for connection with an external circuit are connected with an input terminal 7.

Herein, the first nonlinear resistance element 13 and the second nonlinear resistance element 14, provided in a region between the signal electrode 9 and the display electrode 95 or 96, are composed of "an indium tin oxide film—a tantalum oxide film—a tantalum film" and "a tantalum film—a tantalum oxide film—an indium tin oxide film", respectively.

This means that an electric current path is provided between the signal electrode 9 and the display electrodes 95 or 96 such that electric current flows from "the indium tin oxide film—the tantalum oxide film—the tantalum film" of the first nonlinear resistance element 13 to "the tantalum film—the tantalum oxide film—the indium tin oxide film" of the second nonlinear resistance element 14.

As a result, connection from the signal electrode 9 to the display electrodes 95 or 96 at one of the nonlinear resistance elements, and connection from the display electrode 95 or 96 to the signal electrode 9 at the other of the nonlinear resistance elements become symmetrical to each other.

As is evident from the description as above, a proportion of the area for the overlapping portion 15 can be reduced since the display electrode 95 provided with the overlapping portion 15 overlaps with the T-shaped part 4a of the connection portion 4 and the display electrode 96 without the overlapping portion 15 are alternately disposed.

Consequently, the liquid crystal display according to this embodiment is capable of giving a brighter display in comparison with a case wherein each of the display electrodes is provided with an overlapping portion 15.

Sixth Embodiment

Figure 25:
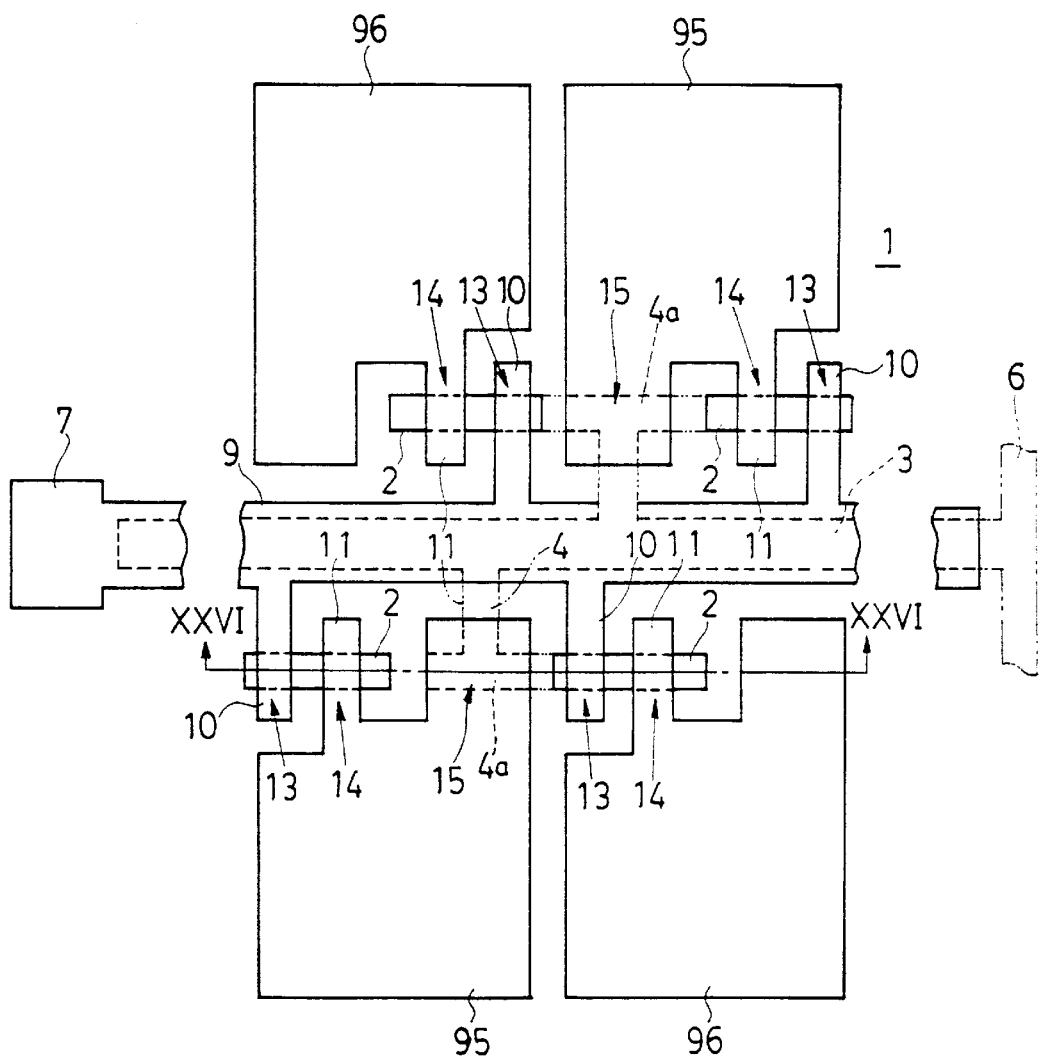
FIG. 25 is a plan view of a portion constituting nonlinear resistance elements of a liquid crystal display according to a sixth embodiment of the invention, and FIG. 26 a sectional view taken along the line XXVI—XXVI of FIG. 25.
Figure 26:
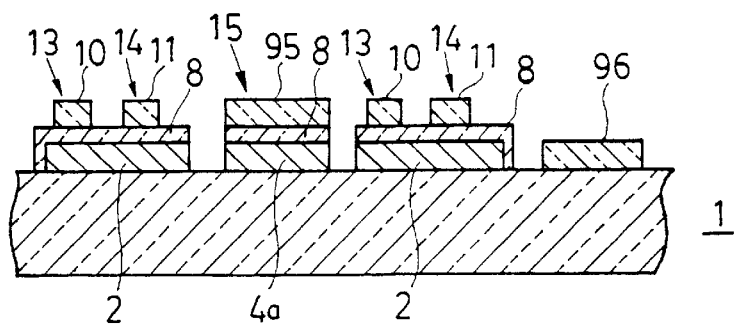

Referring to FIGS. 25 and 26, a liquid crystal display according to a sixth embodiment of the invention is described. FIG. 25 is a plan view showing a part of a region for a first substrate on which nonlinear resistance elements (MIM elements) of a liquid crystal display according to the sixth embodiment of the invention is formed. FIG. 26 is a sectional view taken along the line XXXI—XXXI of FIG. 25.

In this liquid crystal display, four display electrodes, 95, 95, 96, and 96, constitute one pixel. With adoption of this constitution, malfunction of a pixel can be prevented even when a non-linear resistance element of one of the display electrodes malfunctions as long as three other display electrodes are functioning normally.

Furthermore, an improvement on a viewing angle characteristic of the liquid crystal display can be achieved by adoption of a system whereby each of the four display electrodes is provided with the nonlinear resistance element having a different "current-voltage characteristic" by, for example, varying an area of the nonlinear resistance elements for each of the display electrodes.

Anodic oxidation electrodes 3, lower electrodes 2, connection portions 4, each connecting each of the anodic oxidation electrode 3 with two lower electrodes 2 and 2, and provided with a T-shaped part 4a, all of which are composed of a metal film made of aluminum, are provided on a transparent substrate 1, that is, an active substrate on which the nonlinear resistance elements are formed.

The T-shaped part 4a of the connection portion 4 forms an overlapping portion 15 under the display electrodes 95. One side of the T-shaped part 4a is connected with the anodic oxidation electrode 3 via the connection portion 4. The other sides thereof connect with the two lower electrodes 2 via the connection portion 4.

One end of each of the anodic oxidation electrodes is connected with a common electrode 6, and the other end with an input terminal 7 for applying signals from an external circuit on the nonlinear resistance elements. The common electrode 6 serves as an electrode when the anodic oxidation method is applied to the surface of each of the lower electrodes 2 for forming an insulation film 8 thereon.

In the construction adopted for the liquid crystal display, a part of each of the connection portions 4, between the signal electrode 9 and the display electrode 95, and other parts thereof (as shown by a phantom line in FIG. 25) between the overlapping portion 15 resembling the letter T in shape and the two lower electrodes 2 are separated. The connection portion 4 between the signal electrode 9 and the display electrode 95 has one side substantially matching the display electrode 95, and the connection portions 4 between the overlapping portion 15 resembling the letter T in shape and the two lower electrodes 2 have also sides substantially matching the display electrode 95. Further, the common electrode 6 (as shown by a phantom line in FIG. 25) connected with the ignal electrode 9 is also separated from the signal electrode 9.

Regions indicated by phantom lines in the figure covering the connection portion 4 between the anodic oxidation electrode 3 opposite the signal electrode 9 and the display electrode 95 provided with the overlapping portion 15, the connection portions 4 between the overlapping portion 15 resembling the letter T in shape and the two lower electrodes 2, and the common electrode 6 show the condition of an intermediate step in a process of manufacturing the liquid crystal display.

Further, the display electrode 95 provided with the overlapping portion 15 and the display electrode 96 without the overlapping portion 15 are alternately disposed opposite to the signal electrode 9. Two display electrodes 95 and 96 are disposed symmetrically with respect to the signal electrode 9 such that two display electrodes 95 and 95, both provided with the overlapping portion 15 and disposed diagonally, cross two display electrodes 96 and 96 without the overlapping portion 15 and also diagonally disposed. Four display electrodes consisting of two each of the display electrodes 95 and 96 constitute one pixel.

The insulation film 8 composed of a tantalum oxide ($Ta_2O_5$) film formed by applying the anodic oxidation method to the lower electrode 2 is provided on the surface of the lower electrode 2.

A thin metal film is formed on the anodic oxidation electrodes 3 and is used as the signal electrode 9. A first upper electrode 10 connected with the signal electrode 9 is provided on the lower electrode 2, and further a second upper electrode 11 connected with the display electrode 95 and 96 is provided on the aforesaid lower electrode 2.

The first upper electrode 10 and the second upper electrode 11 are provided on the aforesaid lower electrode 2 resembling an island in shape with the insulation film 8 interposed in-between.

A first nonlinear resistance element 13 is composed of the lower electrode 2, the insulation film 8 and the first upper electrode 10, and a second nonlinear resistance element 14 is composed of the lower electrode 2, the insulation film 8 and the second upper electrode 11.

Herein the signal electrodes 9, the first upper electrodes 10, the second upper electrodes 11 and the display electrodes 95 and 96 are all composed of a thin metal film, for example, a thin niobium (Nb) film.

Further the signal electrodes 9 for connection with an external circuit are connected with an input terminal 7.

Herein, the first nonlinear resistance element 13 and the second nonlinear resistance element 14, provided in a region between the signal electrode 9 and the display electrode 95 or 96, are composed of "a thin niobium film—a tantalum oxide film—a tantalum film" and "a tantalum film—a tantalum oxide film—a thin niobium film", respectively.

This means that an electric current path is provided between the signal electrode 9 and the display electrodes 95 or 96 such that electric current flows from "the thin niobium film—the tantalum oxide film—the tantalum film" of the first nonlinear resistance element 13 to "the tantalum film—the tantalum oxide film—the thin niobium film" of the second nonlinear resistance element 14.

As a result, connection from the signal electrode 9 to the display electrodes 95 or 96 at one of the nonlinear resistance elements, and connection from the display electrode 95 or 96 to the signal electrode 9 at the other of the nonlinear resistance elements become symmetrical to each other.

As is evident from the description as above, the overlapping portions 15 are disposed symmetrically with respect to a focal point by arranging the display electrode 95 having the overlapping portion 15 resembling the letter T in shape and the display electrode 96 not having the overlapping portion 15, alternately, opposite to the signal electrode 9 and in such a way that two display electrodes 95 and 95 diagonally disposed across the signal electrode 9 cross two display electrodes 96 and 96 similarly disposed.

As a result, the liquid crystal display provided with the display electrodes 96 without the overlapping portion 15 according to this embodiment is capable of giving a brighter display in comparison with the liquid crystal display wherein every display electrode is provided with the overlapping portion 15.

Seventh Embodiment

Figure 27:
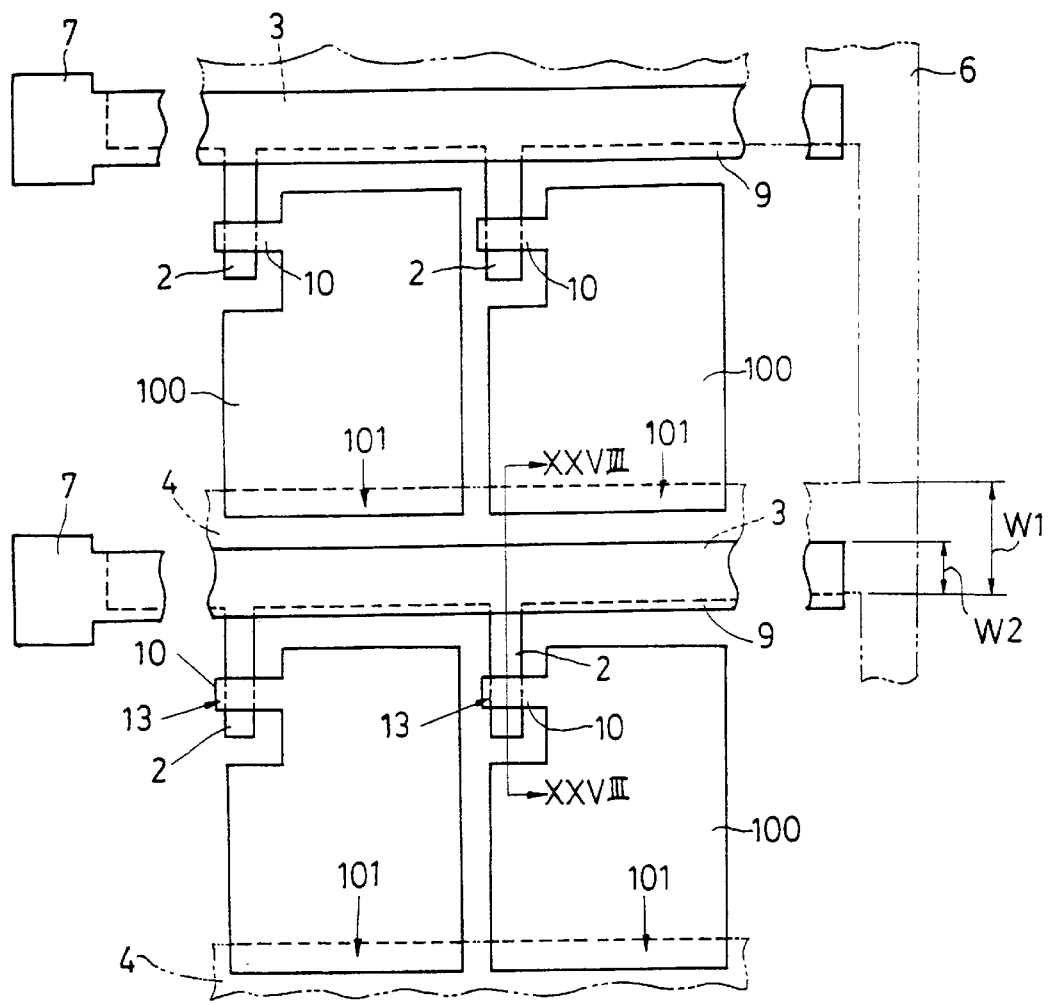
FIG. 27 is a plan view of a portion constituting nonlinear resistance elements of a liquid crystal display according to a seventh embodiment of the invention, and FIG. 28 a sectional view taken along the line XXVIII—XXVIII of FIG. 27.
Figure 28:
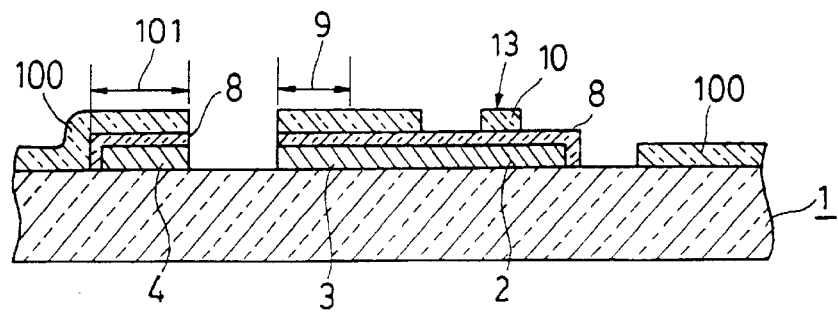
Figure 29:
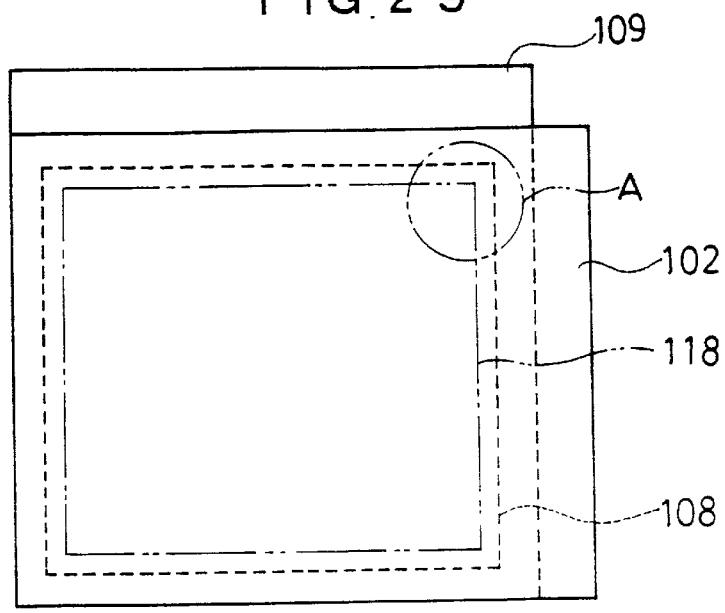
FIG. 29 is a plan view showing a conventional liquid crystal display of a similar type, FIG. 30 an enlarged plan view showing a region inside a circle denoted by A as indicated by a dash and double dotted line in FIG. 29, FIG. 31 a plan view showing a nonlinear resistance element, and FIG. 32 a sectional view taken along the line B—B of FIG. 31
Figure 30:
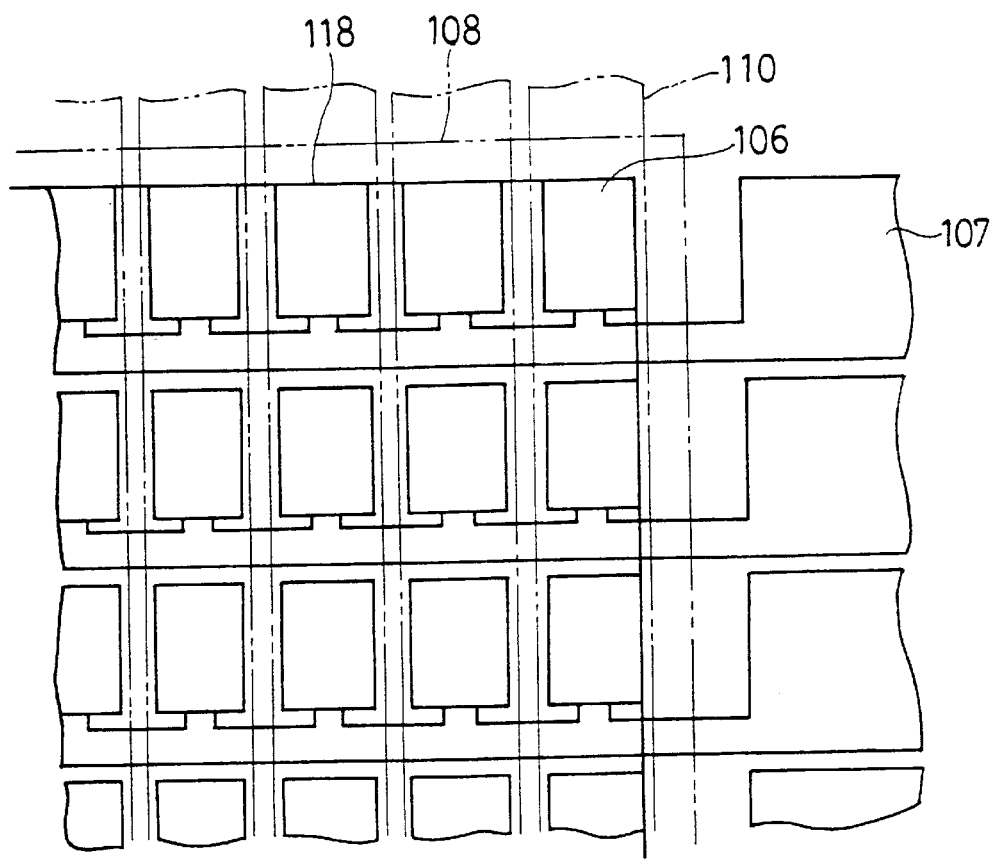
Figure 31:
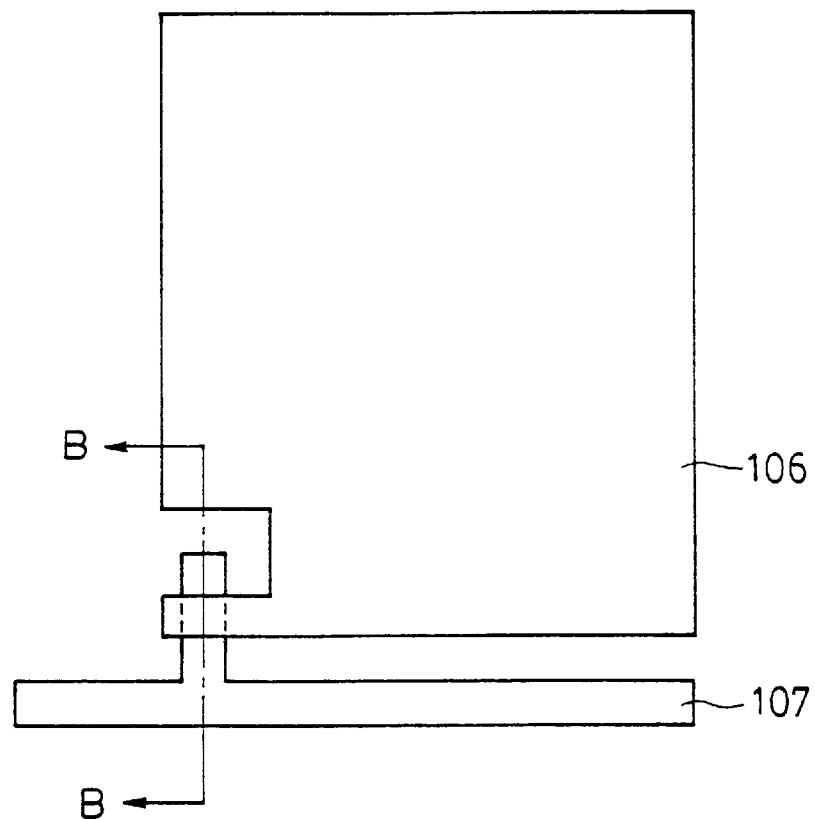
Figure 32:
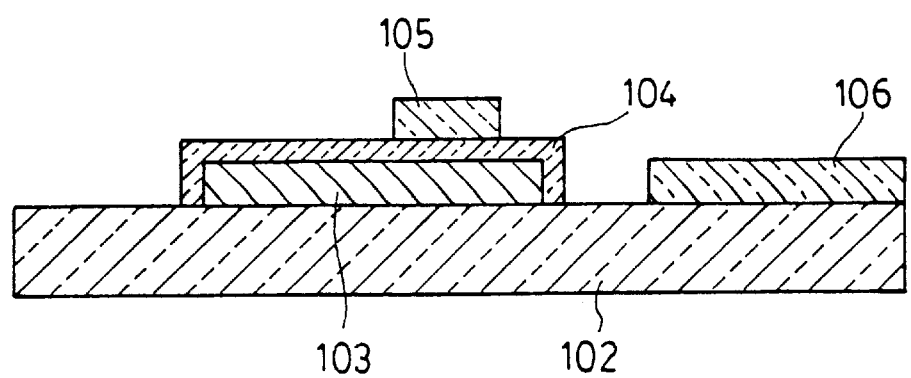

Referring to FIGS. 27 and 28, a liquid crystal display according to a seventh embodiment of the invention is described. FIG. 27 is a plan view showing a part of a region for a substrate on which nonlinear resistance elements (MIM elements) of a liquid crystal display according to this embodiment is formed. FIG. 28 is a sectional view taken along the line XXVIII—XXVIII of FIG. 27.

In this embodiment, an example wherein each of display electrodes 100 is provided with only one nonlinear resistance element 13 is described.

Anodic oxidation electrodes 3 and lower electrodes 2 extended from each of the anodic oxidation electrodes 3, all of which are composed of a metal film made of tantalum (Ta), are formed on a substrate 1, that is, an active substrate on which nonlinear resistance elements are formed. The anodic oxidation electrode 3 has an overlapping portion 101 under the display electrodes 100 adjacent thereto.

An insulation film 8 composed of a tantalum oxide ($Ta_2O_5$) film formed by applying the anodic oxidation method to the lower electrodes 2 is formed on the surface of each of the lower electrodes 2.

A transparent and electrically conductive film is formed on each of the anodic oxidation electrodes 3 and used as a signal electrode 9. An upper electrode 10 connected with each of the display electrodes 100 is provided on each of the lower electrodes 2, and a nonlinear resistance element 13 is composed of a nonlinear resistance layer consisting of the lower electrode 2 and the insulation film 8, and the upper electrode 10.

Herein the signal electrode 9, the upper electrode 10, and the display electrode 100 are all composed of a transparent and electrically conductive film, for example, an indium tin oxide (ITO) film.

Further, the signal electrodes 9 for connection with an external circuit are connected with input terminals 7.

Now, the constitution of the anodic oxidation electrodes 3 is described. One end of each of the anodic oxidation electrodes 3 is connected with a common electrode 6, and the other end with each of the input terminals 7 for applying signals from an external circuit on the nonlinear resistance elements. The common electrode 6 serves as an electrode when the anodic oxidation method is applied to the surface of each of the lower electrodes 2 for forming an insulation film 8 thereon. Before the anodic oxidation method is applied, each of the anodic oxidation electrodes 3 is provided with the overlapping portion 101 under the signal electrode 9 and the adjacent display electrodes 100, and a connection portion 4 consisting of a part connecting the underside of the signal electrode 9 with the overlapping portion 101, and another part connecting together the display electrodes 100 disposed in parallel with the signal electrode 9. Accordingly, the width of the anodic oxidation electrode 3 as indicated by a broken line is W1.

For completion of the liquid crystal display, the part of the connection portion 4, between the underside of the signal electrode 9 and the overlapping portion 101, and the other part thereof between the display electrodes 100 disposed in parallel with the signal electrode 9 are separated, and a wiring width of the liquid crystal display in driving condition is made to be W2 (W2<W1). Further, each of the display electrodes 100 is separated from the signal electrode 9, forming a structure wherein the display electrodes 100 are connected with the signal electrode 9 via the nonlinear resistance element 13.

Further, the connection portion 4 connecting together display electrodes 100 is separated so that the display electrodes 100 are isolated from each other.

The common electrode 6 connected with the signal electrodes 9 is also separated from the signal electrodes 9.

Uniformity in the quality and the thickness of a film formed by the anodic oxidation method is improved and also a high performance film can be formed in a short time by providing the anodic oxidation electrode 3 with the overlapping portion 101 so that the width W1 of the anodic oxidation electrode 3 is enlarged before applying the anodic oxidation method.

This means that the width of the anodic oxidation electrode 3 in use when the liquid crystal display is put to use can be made smaller by providing the overlapping portion 101 under the display electrodes 100, resulting in a brighter display.

Furthermore, it has become possible to improve accuracy in aligning black matrices with the display electrodes 100 by using a part of each of the overlapping portions 101 as a black matrix for improving display quality of a liquid crystal display.

In addition, a photosensitive resin and the display electrodes can be used as etching masks when separating the lower electrodes composing the nonlinear resistance elements from the anodic oxidation electrodes. Consequently, requirements for accuracy in aligning the photosensitive resin film covering the connection portions with the nonlinear resistance elements can be relaxed.

As a result, the liquid crystal display according to this embodiment can contribute to improvement of the display quality with ease. In particular, with respect to prevention of the image sticking phenomenon, it can have an improved characteristic as good as or better than that of a 3-terminal type display.

Further, degradation of nonlinear resistance elements can be minimized by covering the nonlinear resistance elements with the overcoating insulation film, improving the reliability of the liquid crystal display.

INDUSTRIAL UTILIZATION

As described in the foregoing, by use of the liquid crystal display provided with nonlinear resistance elements according to the present invention, it is possible to turn an asymmetrical current-voltage characteristic of nonlinear resistance elements, due to a voltage applied, symmetrical, and to reduce a d-c voltage component applied on a liquid crystal layer, preventing deterioration of image quality or contrast of the liquid crystal display or a flicker phenomenon and an image sticking phenomenon, that is, an after-image phenomenon.

In addition, a photosensitive resin film and the display electrodes can be used as etching masks when separating the lower electrodes composing the nonlinear resistance elements from the anodic oxidation electrodes. Consequently, requirements for accuracy in aligning the photosensitive resin covering the connection portions with the nonlinear resistance elements can be relaxed.

As a result, the liquid crystal display according to this embodiment can contribute to improvement of the display quality with ease. In particular, with respect to prevention of the image sticking phenomenon, it can have an improved characteristic as good as or better than that of a 3-terminal type display.

Further, degradation of nonlinear resistance elements can be minimized by covering the nonlinear resistance elements with the overcoating insulation film, improving the reliability of the liquid crystal display.

Accordingly, the display quality of liquid crystal displays that are in wide use for various kinds of portable or small-sized electronic equipment can be enhanced and efficient manufacturing of the same is realized.

What is claimed is:

1. A liquid crystal display provided with display electrodes disposed in a matrix configuration, said display electrodes serving as pixels, comprising:

a substrate comprising thereon an anodic oxidation electrode, and lower electrodes each resembling an island in shape, both of which are composed of a metal film, an insulation film formed on the metal film, two upper electrodes composed of a transparent and electrically conductive film formed on each of the lower electrodes with the insulation film interposed in-between, display electrodes composed of a transparent and electrically conductive film, and signal electrodes composed of a metal film or a metal film and a transparent and electrically conductive film;

said two upper electrodes being disposed so as to cross each of the lower electrodes, and constituting two nonlinear resistance elements in combination with the insulation film and the aforesaid lower electrode;

said liquid crystal display being characterized in that one of the two upper electrodes constituting the nonlinear resistance elements is connected with the signal electrode, the other with each of the display electrodes; and the display electrodes, serving as pixels, include a first display electrode provided with an overlapping portion having a remaining double layer film thereunder, composed of the same metal film as that composing the lower electrode and the insulation film, and a second display electrode not provided with the overlapping portion.

2. A liquid crystal display provided with display electrodes disposed in a matrix configuration, a plurality of the display electrodes composing one pixel, said liquid crystal display comprising:

a substrate comprising thereon an anodic oxidation electrode, and lower electrodes each resembling an island in shape, both of which are composed of a metal film, an insulation film formed on the metal film, two upper electrodes composed of a transparent and electrically conductive film formed on each of the lower electrodes with the insulation film interposed in-between, display electrodes composed of a transparent and electrically conductive film, and a signal electrode composed of a metal film or a metal film and a transparent and electrically conductive film;

said two upper electrodes being disposed so as to cross each of the lower electrodes, and constituting two nonlinear resistance elements in combination with the insulation film and the aforesaid lower electrode;

said liquid crystal display being characterized in that one of the two upper electrodes constituting the nonlinear resistance elements is connected with the signal electrode, the other with each of the display electrodes; and the plurality of the display electrodes composing one pixel, include a first display electrode provided with an overlapping portion having a remaining double layer film thereunder, composed of the same metal film as that composing the lower electrode and the insulation film, and a second claim 11 display electrode not provided with the overlapping portion.

3. A liquid crystal display provided with display electrodes disposed in a matrix configuration, a plurality of the display electrodes composing one pixel, said liquid crystal display comprising:

a substrate comprising thereon an anodic oxidation electrode, and lower electrodes each resembling an island in shape, both of which are composed of a metal film, an insulation film formed on the metal film, two upper electrodes composed of a transparent and electrically conductive film formed on each of the lower electrodes with the insulation film interposed in-between, display electrodes composed of a transparent and electrically conductive film, and signal electrodes composed of a metal film or a metal film and a transparent and electrically conductive film;

said two upper electrodes being disposed so as to cross each of the lower electrodes, and constituting two nonlinear resistance elements in combination with the insulation film and the aforesaid lower electrode;

said liquid crystal display being characterized in that one of the two upper electrodes constituting the nonlinear resistance elements is connected with each of the signal electrodes, the other with each of the display electrodes; and the plurality of the display electrodes, composing one pixel, include a first display electrode provided with an overlapping portion having a remaining double layer film thereunder, composed of the same metal film as that composing the lower electrode and the insulation film, and the other being the display electrode not provided with the overlapping portion, and the nonlinear resistance elements of the plurality of the display electrodes composing one pixel are concentrated.

* * * * *

UNITED STATES PATENT AND TRADEMARK OFFICE
CERTIFICATE OF CORRECTION

PATENT NO. : 6,512,556 B1
DATED : January 28, 2003
INVENTOR(S) : Kanetaka Sekiguchi It is certified that error appears in the above-identified patent and that said Letters Patent is hereby corrected as shown below:

Column 5,
Line 27, has been amended as follows:
-- The process of forming a photosensitive resin, in a region covering each of the lower electrodes and the first and second upper electrodes, and the following process thereto may be replaced with the following steps: --

Column 27,
Line 56, has been amended as follows:
-- Referring to FIGS. 25 and 26, a liquid crystal display according to a sixth embodiment of the invention is described. FIG. 25 is a plan view showing a part of a region for a first substrate on which nonlineat resistance elements (MIM elements) of a liquid crystal display according to the sixth embodiment of the invention is formed. FIG. 26 is a sectional view taken along the line XXVI-XXVI of FIG. 25. --

Column 32,
Line 58, change "a second claim 11 display electrode" to -- a second display electrode --.

Column 34,
Line 9, change "and the other being the display" to -- and a second display --.

Signed and Sealed this

Nineteenth Day of August, 2003

JAMES E. ROGAN
*Director of the United States Patent and Trademark Office*